(12) United States Patent
Huang et al.

(10) Patent No.: US 9,380,572 B2
(45) Date of Patent: *Jun. 28, 2016

(54) BASE STATION, MOBILE STATION, COORDINATED MOBILE STATION, TRANSMISSION METHOD AND RECEPTION METHOD

(71) Applicant: Panasonic Intellectual Property Corporation of America, Torrance, CA (US)

(72) Inventors: Lei Huang, Singapore (SG); Isamu Yoshii, Chiba (JP); Daichi Imamura, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,382

(22) Filed: Feb. 26, 2015

(65) Prior Publication Data

US 2015/0173053 A1    Jun. 18, 2015

Related U.S. Application Data

(63) Continuation of application No. 13/638,729, filed as application No. PCT/JP2011/002313 on Apr. 20, 2011, now Pat. No. 9,031,022.

(30) Foreign Application Priority Data

Apr. 20, 2010  (JP) ................ 2010-097026

(51) Int. Cl.
*H04W 80/04*  (2009.01)
*H04W 88/06*  (2009.01)
(Continued)

(52) U.S. Cl.
CPC .......... *H04W 72/042* (2013.01); *H04W 72/005* (2013.01); *H04W 72/121* (2013.01); *H04W 88/04* (2013.01)

(58) Field of Classification Search
CPC ..... H04W 80/04; H04W 88/06; H04W 28/04; H04W 72/04
USPC .................................. 370/328, 329
See application file for complete search history.

(56) References Cited

U.S. PATENT DOCUMENTS 7,917,166 B2   3/2011  Cho et al.
2008/0220804 A1*  9/2008  Cho et al. .............. 455/522

(Continued)

FOREIGN PATENT DOCUMENTS

CN   101553034 A   10/2009
JP   2006-094388 A   4/2006

OTHER PUBLICATIONS

English translation of the Search Report for Chinese Application No. 201180017170.5 dated Oct. 31, 2014.
IEEE P802.16m/D5, DRAFT Amendment to IEEE Standard for local and metropolitan area networks—Part 16: Air Interface for Fixed and Mobile Broadband Wireless Access Systems—Advanced Air Interface, Apr. 2010.

(Continued)

*Primary Examiner* — Ronald B Abelson
(74) *Attorney, Agent, or Firm* — Pearne & Gordon LLP

(57) ABSTRACT

A base station (BS) which communicates with a plurality of mobile stations (MSs) is configured so as to comprise a control signal generation unit which generates control signals showing information on the allocation of resources for each of the plurality of mobile stations (MSs), and a transmission unit which transmits the control signals to the plurality of mobile stations (MSs). A control signal for a given mobile station (MS) includes information relating to another mobile station (MS).

17 Claims, 17 Drawing Sheets

(51) Int. Cl.
*H04W 28/04* (2009.01)
*H04W 72/04* (2009.01)
*H04W 72/12* (2009.01)
*H04W 72/00* (2009.01)
*H04W 88/04* (2009.01)

(56) References Cited

U.S. PATENT DOCUMENTS

2008/0227476 A1   9/2008   Cho et al.
2010/0054188 A1*  3/2010   Matsumoto et al. .......... 370/328

OTHER PUBLICATIONS

IEEE C802.16-10/0016r1, Future 802.16 Networks: Challenges and Possibilities, Mar. 15, 2010.
IEEE C802.16-10/0005r1, Client Cooperation in Future Wireless Broadband Networks, Kerstin Johnsson, et al., Jan. 12, 2010.
IEEE 802.16 Broadband Wireless Access Working Group, "Study Report on Hierarchical Networks", Jan. 17, 2011, Inuk Jung, et al.
International Search Report for PCT/JP2011/002313 dated Jul. 5, 2011.

* cited by examiner

BASE STATION, MOBILE STATION, COORDINATED MOBILE STATION, TRANSMISSION METHOD AND RECEPTION METHOD

CROSS-REFERENCE TO RELATED APPLICATIONS

This application claims priority to U.S. patent application Ser. No. 13/638,729, filed on Oct. 1, 2012, entitled "BASE STATION, MOBILE STATION, COORDINATED MOBILE STATION, TRANSMISSION METHOD AND RECEPTION METHOD", which claims priority to PCT/JP2011/002313, filed Apr. 20, 2011, the entireties of which are incorporated herein by reference.

TECHNICAL FIELD

The present invention relates to a base station, a mobile station, a cooperating mobile station, a transmission method and a reception method that perform client collaboration.

BACKGROUND ART

The IEEE (Institute of Electrical and Electronics Engineers) 802.16 Working Group is developing the 802.16m air interface specification to meet the requirements of IMT (International Mobile Telecommunications)—Advanced next generation mobile systems. Based on the IEEE 802.16m draft standard (e.g., see Non-Patent Literature 1), the WiMAX (Worldwide Interoperability for Microwave Access) Forum is working out the WiMAX Release 2.0 MSP (Mobile System Profile) and PICS (Protocol Implementation Conformance Statement). The IEEE 802.16m standard and the WiMAX Release 2.0 MSP and PICS are expected to be finalized in early 2011.

The IEEE 802.16 Working Group has also started envisioning the future 802.16/WiMAX networks beyond 802.16m/WiMAX 2.0. There is a common understanding among 802.16/WiMAX community that future 802.16/WiMAX networks should support explosive mobile data traffic growth driven by large screen devices, multimedia applications as well as more connected users and devices. Future 802.16/WiMAX networks should also interwork efficiently with other radio technologies, e.g., 802.11/Wi-Fi (Wireless Fidelity).

Future 802.16/WiMAX networks should be enhanced significantly compared with 802.16m network in terms of various performance metrics such as throughput and SE (Spectral Efficiency). For example, in urban-coverage scenario, future 802.16/WiMAX networks target at the cell-edge SE of two times of 802.16m/WiMAX 2.0 network in both UL (Uplink) and DL (Downlink) (e.g., see Non-Patent Literature 2). Note that 802.16m/WiMAX 2.0 network has at least a DL cell-edge SE of 0.06 bps/Hz/sec with 4×2 antenna configuration and an UL cell-edge SE of 0.03 bps/Hz/sec with 2×4 antenna configuration.

Co-operative techniques, e.g., CliCo (Client Collaboration), have promised significant improvements in the cell-edge SE and total network energy efficiency of a wireless communication system. CliCo is a technique where clients interact to jointly transmit/receive data in wireless environments (e.g., see Non-Patent Literature 3). In CliCo, client clustering and peer-to-peer communication are exploited to transmit/receive information over multiple paths between BS and client. As a result, the cell-edge SE can be improved without increase in infrastructure cost. Furthermore, the battery of clients with poor channels can be extended.

A diagram illustrating an exemplary wireless communication system 100 with CliCo is shown in FIG. 1. Wireless communication system 100 is configured of BS (Base Station) 102 and a plurality of MSs (Mobile Stations) such as MS 104 and MS 106.

A block diagram illustrating exemplary BS 102 is shown in FIG. 2. BS 102 is equipped with WiMAX communication function only, which is configured of WiMAX PHY block 130 and WiMAX MAC block 120. WiMAX MAC block 120 implements WiMAX OFDMA (Orthogonal Frequency Division Multiple Access)-based media access control protocols. WiMAX PHY block 130 implements the WiMAX OFDMA-based physical layer protocols under the control of WiMAX MAC block 120.

With reference to FIG. 2, WiMAX MAC block 120 further is configured of control section 122, scheduler 124, message generation section 126, and message processing section 128. Control section 122 controls general MAC protocol operations. Scheduler 124 schedules the allocation of resources to the MSs under the control of control section 122. Message generation section 126 receives resource allocation scheduling information from scheduler 124 and then generates data packets and DL control information. Message processing section 128 analyzes data packets and UL control information received from the plurality of MSs under the control of control section 122 and reports its analysis result to control section 122.

Note that data packets and DL control information generated by message generation section 126 are transmitted by BS 102 to the plurality of MSs via an OFDMA transmitter (not shown in FIG. 2) inside WiMAX PHY block 130. Data packets and UL control information analyzed by message processing section 128 are received by BS 102 via an OFDMA receiver (not shown in FIG. 2) inside WiMAX PHY block 130.

With reference to FIG. 2, there are HFBCH (HARQ Feedback Channel) generation section 132 and resource allocation generation section 134 inside message generation section 126, where HARQ stands for Hybrid Automatic Repeat Request.

HFBCH generation section 132 generates HARQ feedback channels for UL data transmission, which carry HARQ feedback information (e.g., ACK/NACK) for UL data transmission. Resource allocation generation section 134 generates resource allocation control information for DL/UL data transmission, which carries resource allocation information for each of the plurality of MSs.

In terms of GRA (Group Resource Allocation), resource allocation control information generated by resource allocation generation section 134 may contain group configuration information as well as group resource allocation information including indexing information of HFBCH for DL/UL GRA transmission. The HFBCHs generated by HFBCH generation section 132 may contain HARQ feedback information for UL GRA transmission.

With reference to FIG. 2, there exists HFBCH analyzing section 136 inside message processing section 128. HFBCH analyzing section 136 analyzes the received HFBCHs for DL data transmission and determines whether the corresponding DL data transmission is successful or not. In terms of GRA, HFBCH analyzing section 136 may derive HARQ feedback information for DL GRA transmission from the received UL control information.

A block diagram illustrating exemplary MS 104 is shown in FIG. 3. MS 104 is equipped with both WiMAX and Wi-Fi communication functions, which is configured of WiMAX PHY block 142, Wi-Fi PHY block 144, WiMAX MAC block 146, Wi-Fi MAC block 148, and GLL (Generic Link Layer) block 150. WiMAX MAC block 146 implements WiMAX OFDMA-based MAC (media access control) protocols. WiMAX PHY block 142 implements the WiMAX OFDMA-based physical layer protocols, under the control of WiMAX MAC block 146. Wi-Fi MAC block 148 implements Wi-Fi CSMA/CA (Carrier Sense Multiple Access with Collision Avoidance)-based MAC (media access control) protocols. Wi-Fi PHY block 144 implements the Wi-Fi OFDM (Orthogonal Frequency Division Multiplexing)/DSSS (Direct Sequence Spread Spectrum)-based physical layer protocols, under the control of Wi-Fi MAC block 148. GLL block 150 functions as managing interworking between heterogeneous WiMAX and Wi-Fi links.

With reference to FIG. 3, WiMAX MAC block 146 further is configured of control section 154, message generation section 152, and message processing section 156. Control section 154 controls general MAC protocol operations. Message generation section 152 generates UL control information and data packets under the control of control section 154. Message processing section 156 analyzes data packets and DL control information received from BS 102 under the control of control section 154, and provides its analysis result to control section 154.

Note that data packets and UL control information generated by message generation section 152 are transmitted from MS 104 to BS 102 via an OFDMA transmitter (not shown in FIG. 3) inside WiMAX PHY block 142. Data packets and DL control information analyzed by message processing section 156 are received by MS 104 via an OFDMA receiver (not shown in FIG. 3) inside WiMAX PHY block 142.

With reference to FIG. 3, there are resource analyzing section 151 and HFBCH analyzing section 153 inside message processing section 156. HFBCH analyzing section 153 analyzes the received HFBCHs for UL data transmission and determines whether the corresponding UL data transmission is successful or not. Resource analyzing section 151 analyzes the received resource allocation control information and derives the resource allocation information specific to MS 104. In case of UL data transmission, data packet generated by message generation section 152 under the control of control section 154 will then be transmitted by MS 104 to BS 102 according to the derived resource allocation information. In case of DL data transmission, data packet transmitted by BS 102 to MS 104 will then be received by MS 104 according to the derived resource allocation information.

In terms of GRA, resource analyzing section 151 inside message processing section 156 may derive group configuration information as well as group resource allocation information including indexing information of HFBCH for DL/UL GRA transmission from received resource allocation control information. HFBCH analyzing section 153 may derive HARQ feedback information for UL GRA transmission from the received HFBCHs.

With reference to FIG. 3, there exists HFBCH generation section 155 inside message generation section 152. HFBCH generation section 155 generates HARQ feedback channels, which include HARQ feedback information, for DL data transmission. In terms of GRA, HFBCH generation section 155 may generate HARQ feedback channels for DL GRA transmission.

A block diagram illustrating exemplary MS 106 is shown in FIG. 4. MS 106 is also equipped with both WiMAX and Wi-Fi communication functions, which has a very similar structure and functionality as MS 104. A main difference between MS 104 and MS 106 is that unlike MS 106, there is scheduler 158 inside Wi-Fi MAC block 148 of MS 104 as shown in FIG. 3, which is used for cooperation scheduling for CliCo.

With reference to FIG. 1, BS 102 communicates with MS 104 via WiMAX links 108a and 108b, and communicates with MS 106 via WiMAX links 110a and 110b. MS 104 communicates with MS 106 via peer-to-peer Wi-Fi links 112a and 112b. Alternatively, MS 104 may communicate with MS 106 via other radio technologies if available, such as WiMAX, Bluetooth, or 60 GHz mmW (Millimeter Wave).

Note that CliCo can be implemented in both DL and UL of wireless communication system 100. As an example, the operation of UL CliCo in wireless communication system 100 is described below.

With reference to FIG. 1, when the signal quality of WiMAX link 108a between BS 102 and MS 104 becomes poor, MS 104 may start the UL CliCo procedure such as neighbor discovery and cooperator selection/allocation. If the signal quality of WiMAX link 110a between BS 102 and MS 106 is good, MS 104 may select MS 106 as its cooperator. In the context of CliCo, MS 104 is called originating MS, and MS 106 is called cooperating MS.

CliCo may happen in various scenarios. For example, originating MS 104 may be deep inside a cafeteria and thus the signal quality of WiMAX links for originating MS 104 may be very poor. However, cooperating MS 106 may be much closer to window or entrance of the cafeteria than originating MS 104, and thus cooperating MS 106 may have a much better signal quality of WiMAX links than originating MS 104.

A diagram illustrating an exemplary frame structure 200 is shown in FIG. 5, which can be applied to wireless communication system 100 with CliCo as shown in FIG. 1. With reference to FIG. 5, each of frame 202 and frame 212 is configured of eight subframes. Five of them are DL subframes, and the others are UL subframes.

So far as UL CliCo is concerned, during first DL subframe 204 of frame 202, BS 102 may transmit MAP 220 indicating control information to a plurality of MSs connected to BS 102, including originating MS 104 and cooperating MS 106 engaged in CliCo. MAP 220 is configured of a plurality of MAP IEs (Information Elements). Some of MAP IEs may carry HARQ feedback information for UL data transmission; and some of MAP IEs may carry resource allocation information for DL/UL data transmission. One MAP IE in MAP 220 carrying HARQ feedback information forms one HBFCH for UL data transmission.

During time period 208 between first DL subframe 204 and first UL subframe 206 of frame 202, originating MS 104 and cooperating MS 106, respectively, need to decode MAP 220 to obtain their resource allocation information including HFBCH indexing information. Also originating MS 104 needs to transmit UL data burst 250 to cooperating MS 106 via peer-to-peer Wi-Fi link 112a.

During first UL subframe 206 of frame 202, if originating MS 104 successfully decodes MAP 220 sent by BS 102 via WiMAX link 108b, it will transmit UL data burst 250 to BS 102 via WiMAX link 108a according to its received resource allocation information. On the other hand, if cooperating MS 106 successfully decodes MAP 220 sent by BS 102 via WiMAX link 110b and successfully receives UL data burst 250 sent by originating MS 104 via peer-to-peer Wi-Fi link 112a, cooperating MS 106 will simultaneously transmit the same UL data burst 250 to BS 102 via WiMAX link 110a according to its received resource allocation information. Consequently BS 102 can combine two copies of UL data burst 250 received from WiMAX link 108a and WiMAX link 110a to improve the quality of received signal.

During second DL subframe 214 of frame 212, BS 102 may transmit MAP 240 to the plurality of MSs connected to BS 102, including originating MS 104 and cooperating MS 106 engaged in CliCo. As mentioned above, some of HFBCHs in MAP 240 may carry HARQ feedback information for UL data burst 250 transmitted by originating MS 104 and cooperating MS 106 during first UL subframe 206 of frame 202.

During time period 218 between second DL subframe 214 and first UL subframe 216 of frame 212, originating MS 104 and cooperating MS 106, respectively, need to decode the corresponding HFBCHs in MAP 240 to obtain their HARQ feedback information for UL data burst 250 according to their HFBCH indexing information which are obtained by decoding MAP 220 during time period 208.

During first UL subframe 216 of frame 212, if the HARQ feedback information implies that BS 102 does not successfully decode UL data burst 250 transmitted by originating MS 104 and cooperating MS 106 during first UL subframe 206 of frame 202, originating MS 104 and cooperating MS 106 may need to retransmit UL data burst 250.

As mentioned above, future 802.16/WiMAX networks should support explosive mobile data traffic. Furthermore, future 802.16/WiMAX networks should provide enhanced quality of experience for mobile internet applications, such as VoIP (Voice over Internet Protocol). Considering VoIP has a periodic traffic pattern and with relatively fixed payload size, various PHY/MAC mechanisms have been designed especially to improve quality of experience for VoIP such as PA (Persistent Allocation) and GRA. In the present invention, the application of GRA to CliCo is addressed.

GRA mechanism specified in the IEEE 802.16m draft standard (e.g., see Non-Patent Literature 1) does not deal with CliCo. However, GRA mechanism can be applied to CliCo in a straightforward manner.

According to the IEEE 802.16m draft standard (e.g., see Non-Patent Literature 1), GRA mechanism allocates resources to multiple users as a group in order to save control overhead. This resource allocation is performed per transport flow. With reference to FIG. 1, the method of applying GRA to CliCo is configured of two operations: That is, i) BS 102 adds flows of originating MS 104 and cooperating MS 106 into a group or deletes flows of originating MS 104 and cooperating MS 106 from a group.
ii) BS 102 allocates resources to the flows of originating MS 104 and cooperating MS 106 within the same group.

According to the IEEE 802.16m draft standard (e.g., see non-Patent Literature 1), when adding a flow of originating MS 104 (or cooperating MS 106) into a group, BS 102 transmits group configuration information in a unicast MAC control message to originating MS 104 (or cooperating MS 106). When allocating resources to the flows of originating MS 104 and/or cooperating MS 106 within the group, BS 102 transmits group resource allocation information including HFBCH indexing information in a multicast MAP IE to originating MS 104 and cooperating MS 106. Note that group configuration information transmitted in the unicast MAC control message and group resource allocation information transmitted in the multicast MAP IE are generated by message generation section 126 as shown in FIG. 2.

According to the IEEE 802.16m draft standard (e.g., see Non-Patent Literature 1), the group configuration information transmitted in the unicast MAC control message can be used to interpret the group resource allocation information transmitted in the corresponding multicast MAP IE. The content of the group configuration information includes:
  Flow identifier;
  User bitmap size;
  UBI (User Bitmap Index);
  Group identifier;
  Allocation periodicity; and
  MIMO (Multiple Input Multiple Output) mode set or the like The flow identifier is used to inform an MS which of its flows is added into a group, which has a size of 4 bits. The user bitmap size indicates the number of bits used for user bitmap transmitted in the multicast MAP IE. The user bitmap size may be one of 4 bits, 8 bits, 16 bits, and 32 bits. The UBI indicates the index of the flow of MS in the user bitmap, which has a size of 5 bits. The group identifier uniquely identifies the DL/UL group to which the flow of MS is added, which has a size of 12 bits. The allocation periodicity specifies how often the multicast MAP IE carrying the corresponding group resource allocation information is transmitted, which may be one of 1 frame, 2 frames, 4 frames, and 8 frames. The MIMO mode set signals MIMO modes supported in the group.

A main difference between the group configuration information for originating MS 104 and cooperating MS 106 is that the UBIs of originating MS 104 and cooperating MS 106 are different. Furthermore, since the group configuration information is unicast to originating MS 104 and cooperating MS 106, respectively, cooperating MS 106 does not know the UBI of originating MS 104; vice versa.

According to the IEEE 802.16m draft standard (e.g., see Non-Patent Literature 1), the group configuration information may further include a set of four HARQ burst sizes. For example, the set of four HARQ burst sizes may be {6 bytes, 8 bytes, 9 bytes, 10 bytes}. Note that the burst size is the size of encoded packet which may be partitioned into a plurality of FEC (Forward Error Correction) blocks. The burst size may include the addition of CRC (Cyclic Redundancy Code) per burst and/or per FEC block when applicable.

Corresponding to each of four HARQ burst sizes, the group configuration information may also include a set of eight resource sizes. For example, for the HARQ burst size of 9 bytes, the set of eight resource sizes may be {1 LRU, 2 LRUs, 3 LRUs, 4 LRUs, 5 LRUs, 6 LRUs, 7 LRUs, 8 LRUs} where LRU stands for Logical Resource Unit. For each of other three HARQ burst sizes of 6 bytes, 8 bytes and 10 bytes, the set of eight resource sizes may be different or the same as the HARQ burst size of 9 bytes.

According to the IEEE 802.16m draft standard (e.g., see Non-Patent Literature 1), a portion of the group resource allocation information is carried by bitmaps transmitted in the multicast MAP IE. A diagram illustrating exemplary bitmaps carrying partial group resource allocation information according to the IEEE 802.16m draft standard (Non-Patent Literature 1) is shown in FIG. 6. There are two bitmaps used to carry partial group resource allocation information. One is user bitmap 302, and the other is resource allocation bitmap 304.

According to the IEEE 802.16m draft standard (e.g., see Non-Patent Literature 1), user bitmap 302 uses 1 bit per flow to signal which flows are scheduled in the current frame. With reference to FIG. 6, the UBI of originating MS 104 is "00000", and therefore the first bit of user bitmap 302 is referenced. The UBI of cooperating MS 106 is "00011" and so the fourth bit of user bitmap 302 is referenced. So the flows (corresponding to data) of both originating MS 104 and cooperating MS 106 are specified by resource allocation map 304 and transmitted to the current frame.

With reference to FIG. 6, resource allocation bitmap 304 is configured of a plurality of 5-bit resource allocation indications, each of which is for a specific scheduled flow. In each of 5-bit resource allocation indications, the first 2 bits is used to signal HARQ burst size and the last 3 bits is used to signal resource size.

With reference to FIG. 6, the HARQ burst sizes are selected from among four burst sizes {6 bytes, 8 bytes, 9 bytes, 10 bytes} and indicated by "00," "01," "10" and "11."
In FIG. 6, both originating MS 104 and cooperating MS 106 are indicated by "10" and therefore both HARQ burst sizes are 9 bytes.
The resource sizes of originating MS 104 and cooperating MS 106 are indicated by "111" and "001", respectively. So the resource sizes of originating MS 104 and cooperating MS 106 may be 8 LRUs and 2 LRUs, respectively.

According to the IEEE 802.16m draft standard (e.g., see Non-Patent Literature 1), in addition to user bitmap 302 and resource allocation bitmap 304, another bitmap called MIMO bitmap may be used if multiple MIMO modes are supported in a group.

A table illustrating an exemplary GRA MAP IE for transmitting the group resource allocation information according to the IEEE 802.16m draft standard (e.g., see Non-Patent Literature 1) is shown in Table 1.

TABLE 1

| Syntax | Size (bit) | Description/Notes |
| --- | --- | --- |
| GRA_MAP_IE( ){ | | |
| MAP IE type | 4 | GRA MAP IE |
| User bitmap | Variable | Indicate scheduled MSs in a group. The size of the bitmap is equal to the User Bitmap Size signaled to each MS in the group configuration information. |
| Resources Offset | 7 | Indicate starting LRU for resource allocation to this group. |
| HFA offset | 6 | Indicate the start of the HFBCH index used for scheduled allocations. |
| Resource Allocation Bitmap | Variable | Indicate the HARQ burst size/resource size for each of scheduled MSs. |
| ... | | |
| } | | |

In addition, according to the IEEE 802.16m draft standard (e.g., see Non-Patent Literature 1), the HFBCH index for a scheduled flow in a group is a predetermined function of its UBI and the HFA offset as shown in Table 1. In other words, each of originating MS 104 and cooperating MS 106 can compute its HFBCH index according to its UBI after decoding the GRA MAP IE as shown in Table 1.

A flowchart illustrating method 400 of receiving resource allocation information at originating MS 104 (or cooperating MS 106) according to the IEEE 802.16m draft standard (e.g., see Non-Patent Literature 1) is shown in FIG. 7. Method 400 starts at Step 402. At Step 404, originating MS 104 (or cooperating MS 106) checks the user bitmap according to its UBI. At Step 406, originating MS 104 (or cooperating MS 106) determines whether its flow is scheduled in the current frame. If the flow of originating MS 104 (or cooperating MS 106) is scheduled in the current frame, at Step 408, it proceeds to check the resource allocation bitmap to derive its HARQ burst size and resource size according to its UBI. After that, at Step 410, originating MS 104 (or cooperating MS 106) computes its HFBCH index according to its UBI. At Step 406, if the flow of originating MS 104 (or cooperating MS 106) is not scheduled in the current frame, method 400 stops at Step 412.

CITATION LIST

Non-Patent Literature

NPL 1
IEEE P802.16m/D5, DRAFT Amendment to IEEE Standard for local and metropolitan area networks—Part 16: Air Interface for Broadband Wireless Access Systems—Advanced Air Interface
NPL 2
IEEE C802.16-10/0016r1, Future 802.16 Networks: Challenges and Possibilities
NPL 3
IEEE C802.16-10/0005r1, Client Cooperation in Future Wireless Broadband Networks

SUMMARY OF INVENTION

Technical Problem

According to the IEEE 802.16m draft standard (e.g., see Non-Patent Literature 1), both originating MS 104 and cooperating MS 106 engaged in CliCo handle the same data burst. One HFBCH for both originating MS 104 and cooperating MS 106 is enough. However, due to different UBIs in the same group, originating MS 104 and cooperating MS 106 have two different HFBCHs. This would waste valuable HFBCH resource.

It is an object of the present invention to provide a base station, a mobile station, a cooperating mobile station, a transmission method and a reception method capable of avoiding unnecessary HFBCH resource waste by using one HBCH for a plurality of MSs that deals with the same data burst.

Solution to Problem

In accordance with an aspect of the present invention, a base station (BS) that communicates with a plurality of mobile stations (MSs), employs a configuration including: a control signal generation section that generates control signals indicative of resource allocation information for each of the plurality of MSs, and a transmission section that transmits the control signals to the plurality of MSs, in which a control signal for a mobile station (MS) contains information on another MS.

In accordance with an aspect of the present invention, a BS communicates with a plurality of MSs including an originating MS and a cooperating MS, which is exploited to communicate between the BS and the originating MS, and includes: a control signal generation section that generates control signals indicative of resource allocation information for each of the plurality of MSs, and a transmission section that transmits the control signals to the plurality of MSs, in which a control signal for the cooperating MS contains information on the originating MS.

In accordance with an aspect of the present invention, when a flow of the cooperating MS is added into a same group as the originating MS, the control signal for the cooperating MS contains information on the originating MS.

In accordance with an aspect of the present invention, the information on the originating MS is contained into resource allocation information for the cooperating MS.

In accordance with an aspect of the present invention, the information on the originating MS is replaced with burst size information for the cooperating MS.

In accordance with an aspect of the present invention, the number of bits of the information on the originating MS varies depending on the number of MSs which belong to a same group as the originating MS.

In accordance with an aspect of the present invention, the number of bits of the information on the originating MS varies with increasing of the number of bits of the burst size information for the cooperating MS and with decreasing of the number of bits of the resource size information for the cooperating MS, depending on the number of MSs which belong to a same group as the originating MS.

In accordance with an aspect of the present invention, if the number of bits of the resource size information for the cooperating MS is decreased, an actual resource size of the cooperating MS results from a bitwise operation of a resource size of the originating MS and a nominal resource size of the cooperating MS.

In accordance with an aspect of the present invention, a resource size of the cooperating MS is same as that of the originating MS, and the information on the originating MS is replaced with burst size information and resource size information for the cooperating MS.

In accordance with an aspect of the present invention, an actual resource size of the cooperating MS results from a bitwise operation of a resource size of the originating MS and a nominal resource size of the cooperating MS.

In accordance with an aspect of the present invention, a resource size of the cooperating MS is set to a predetermined size, and the information on the originating MS is replaced with burst size information and resource size information for the cooperating MS.

In accordance with an aspect of the present invention, the information on the originating MS is identification information of the originating MS.

In accordance with an aspect of the present invention, the information on the originating MS is an offset of identification information of the originating MS relative to identification information of the cooperating MS.

In accordance with an aspect of the present invention, an MS includes: a reception section that receives a control signal for the MS containing information on another MS; and a resource calculating section that computes a transmission resource according to the control signal and the information on the other MS.

In accordance with an aspect of the present invention, a cooperating MS exploited to communicate between a BS and an originating MS includes: a reception section that receives a control signal for the cooperating MS containing information on the originating MS; a resource calculating section that computes a transmission resource according to the control signal and the information on the originating MS; and a transmission section that transmits a signal received from the originating MS, to the BS via the transmission resource.

In accordance with an aspect of the present invention, if the information on the originating MS indicates identification information of the cooperating MS, the transmission section stops transmitting the signal to the BS.

In accordance with an aspect of the present invention, if the information on the originating MS indicates identification information of the cooperating MS, the transmission section stops transmitting the signal to the BS for a predetermined or configurable time period.

In accordance with an aspect of the present invention, a part of the information on the originating MS is contained into resource allocation information for the cooperating MS and other part of the information on the originating MS is contained into group configuration information sent to the cooperating MS.

In accordance with an aspect of the present invention, a transmission method performed in a BS which communicates with a plurality of MSs includes: generating control signals indicative of resource allocation information for each of the plurality of MSs, and transmitting the control signals to the plurality of MSs, in which a control signal for a MS contains information on another MS.

In accordance with an aspect of the present invention, a transmission method performed in a BS which communicates with a plurality of MSs including an originating MS and a cooperating MS, which is exploited to communicate between the BS and the originating MS includes: generating control signals indicative of resource allocation information for each of the plurality of MSs, and transmitting the control signals to the plurality of MSs, in which a control signal for the cooperating MS contains information on the originating MS.

In accordance with an aspect of the present invention, a reception method performed in an MS includes: receiving a control signal for the MS containing information on another MS; and computing a transmission resource according to the control signal and the information on the other MS.

In accordance with an aspect of the present invention, a reception method performed in a cooperating MS exploited to communicate between a BS and an originating MS includes: receiving a control signal for the cooperating MS containing information on the originating MS; computing a transmission resource according to the control signal and the information on the originating MS; and transmitting a signal received from the originating MS, to the BS via the transmission resource.

These and other features and advantages of the present invention will be better understood with reference to the following detailed description of the present invention, along with the accompanying figures, and appended claims.

Advantageous Effects of Invention

The invention uses one HFBCH for a plurality of MSs which handles the same data burst, so that unnecessary HFBCH resource waste can be avoided.

DESCRIPTION OF EMBODIMENTS

Various embodiments of the present invention will now be described in detail with reference to the annexed drawings. In the following description, a detailed description of known functions and configurations incorporated herein has been omitted for clarity and conciseness.

Embodiment 1

Figure 1:
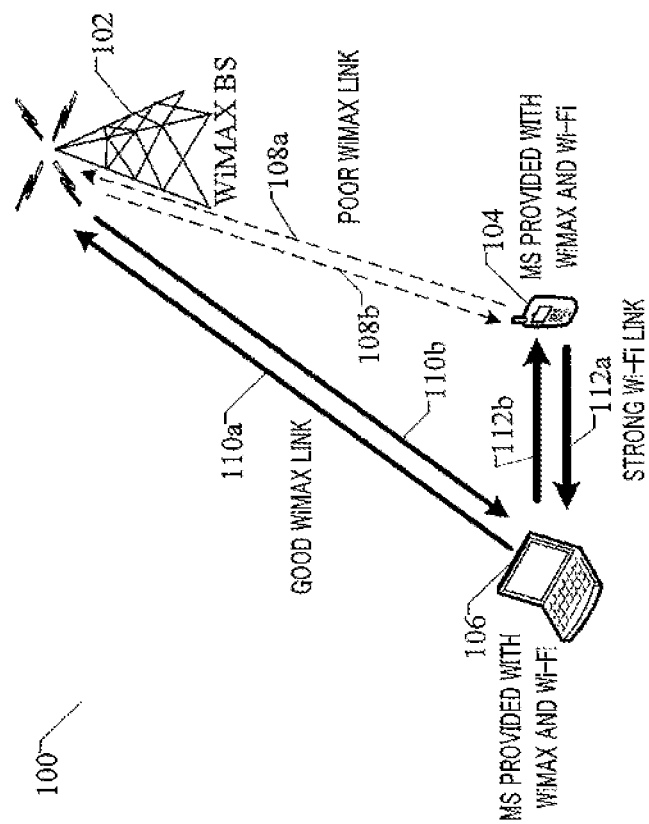
FIG. 1 shows a diagram illustrating an exemplary wireless communication system with CliCo (Client Collaboration)
Figure 2:
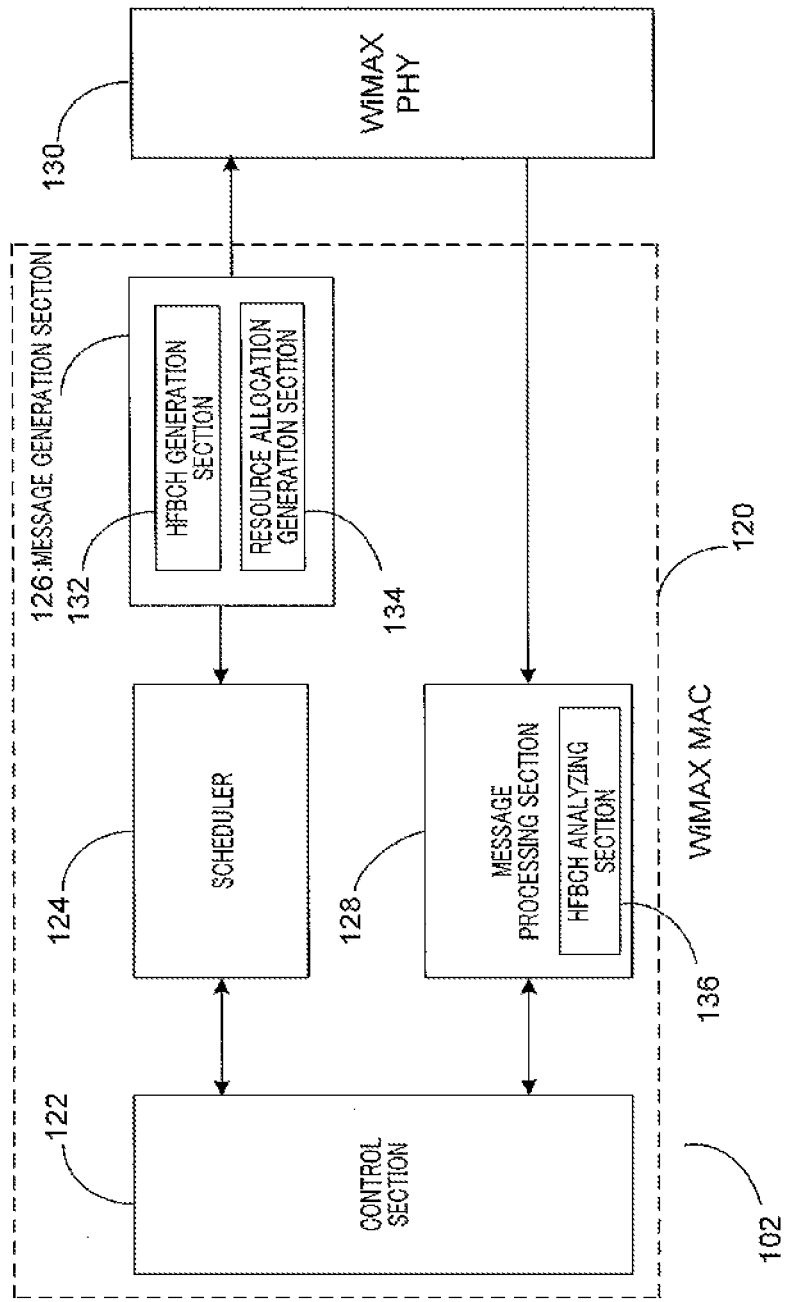
FIG. 2 shows a block diagram illustrating an exemplary BS (Base Station)
Figure 3:
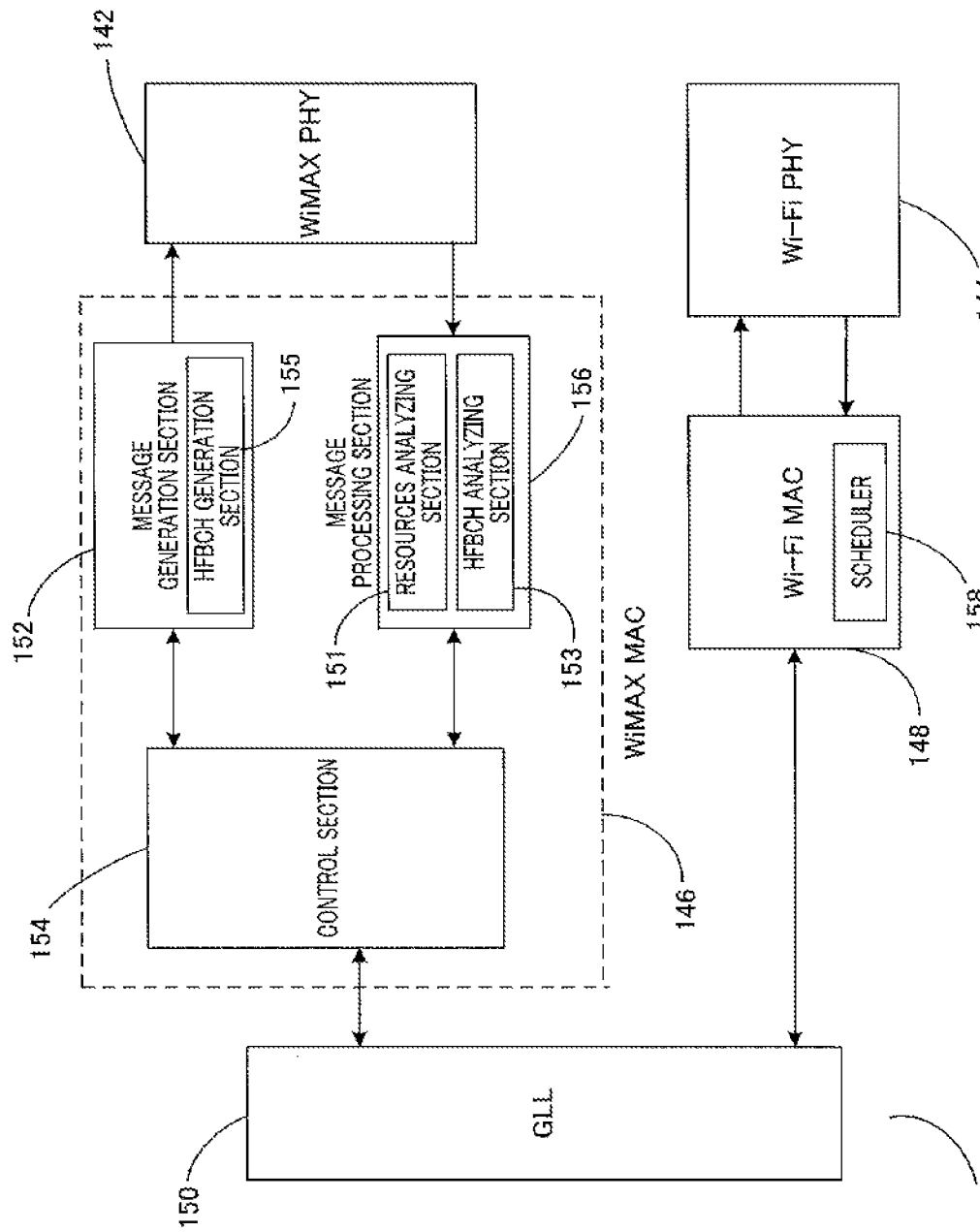
FIG. 3 shows a block diagram illustrating an exemplary originating MS (Mobile Station)
Figure 4:
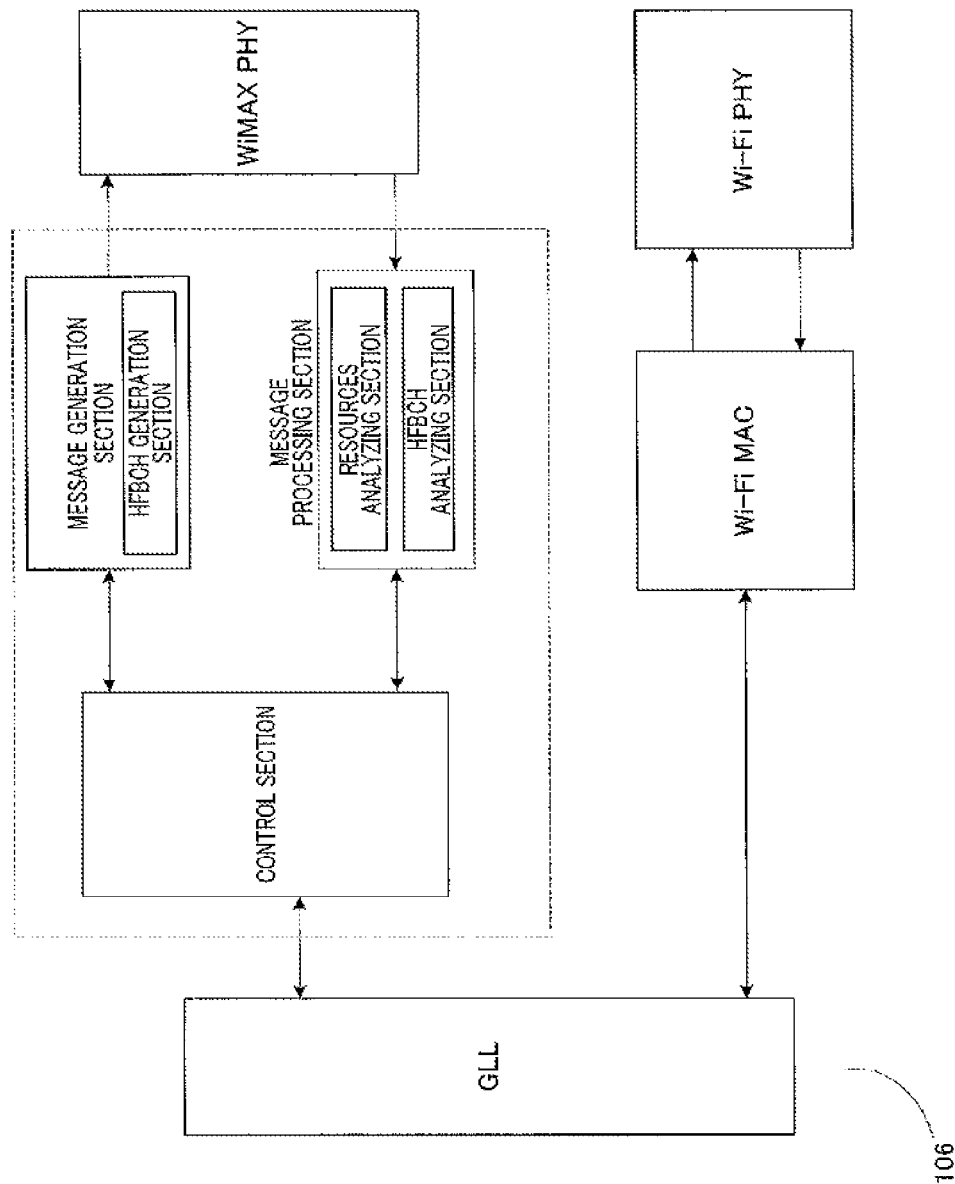
FIG. 4 shows a block diagram illustrating an exemplary cooperating MS (Mobile Station)
Figure 5:
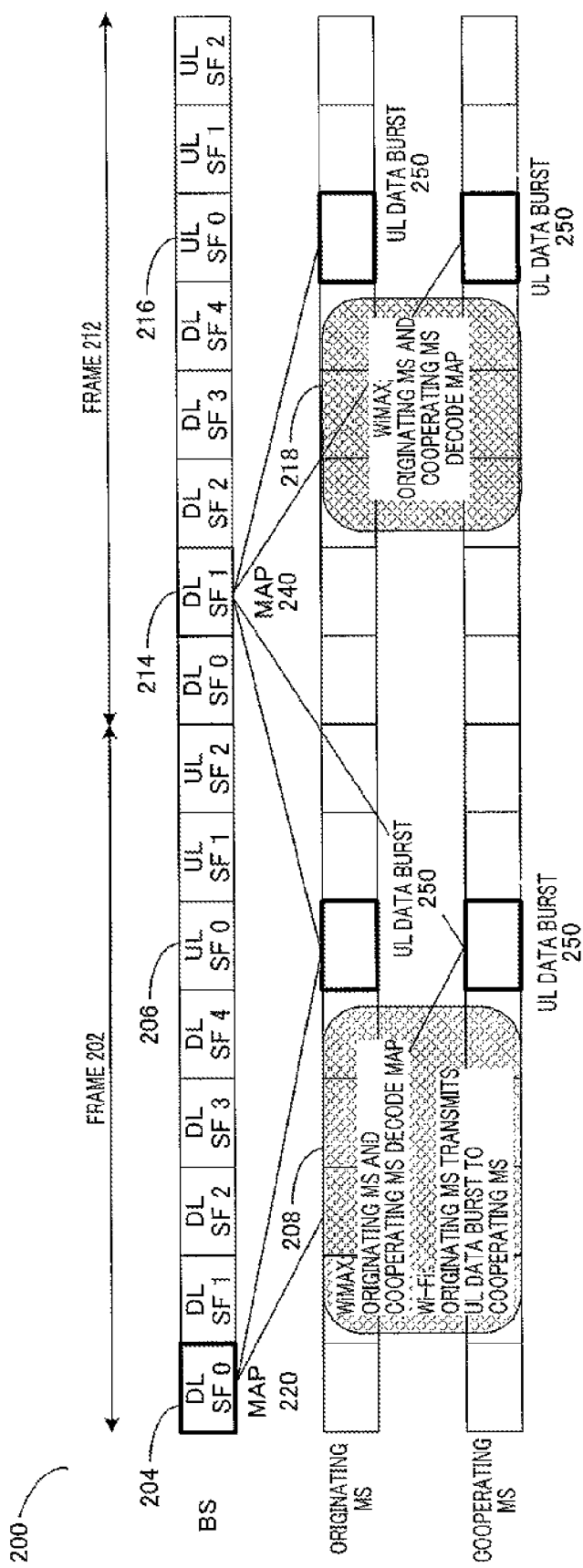
FIG. 5 shows a diagram illustrating an exemplary frame structure.
Figure 6:
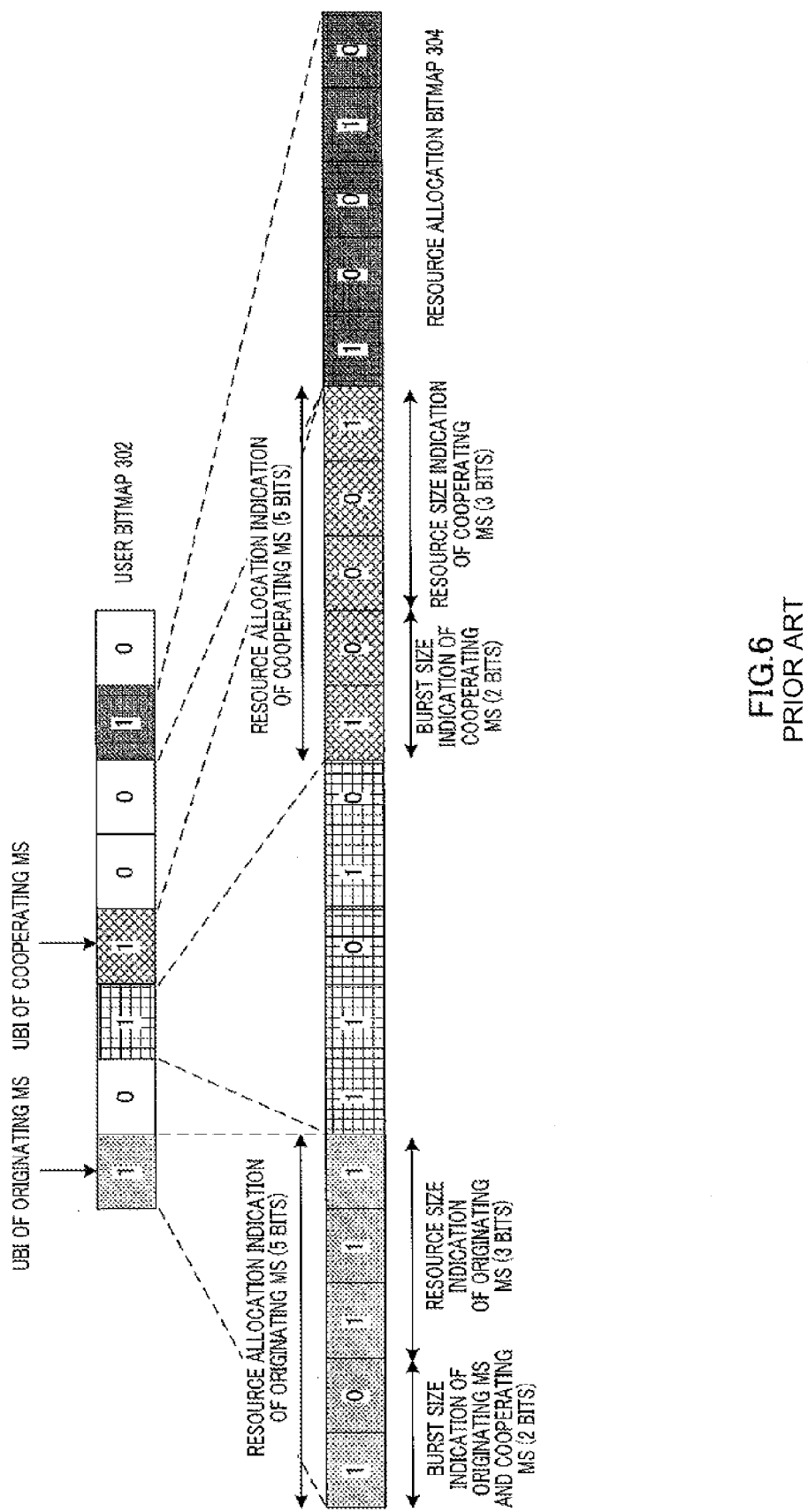
FIG. 6 shows a diagram illustrating exemplary bitmaps for carrying partial group resource allocation information according to the prior art.
Figure 7:
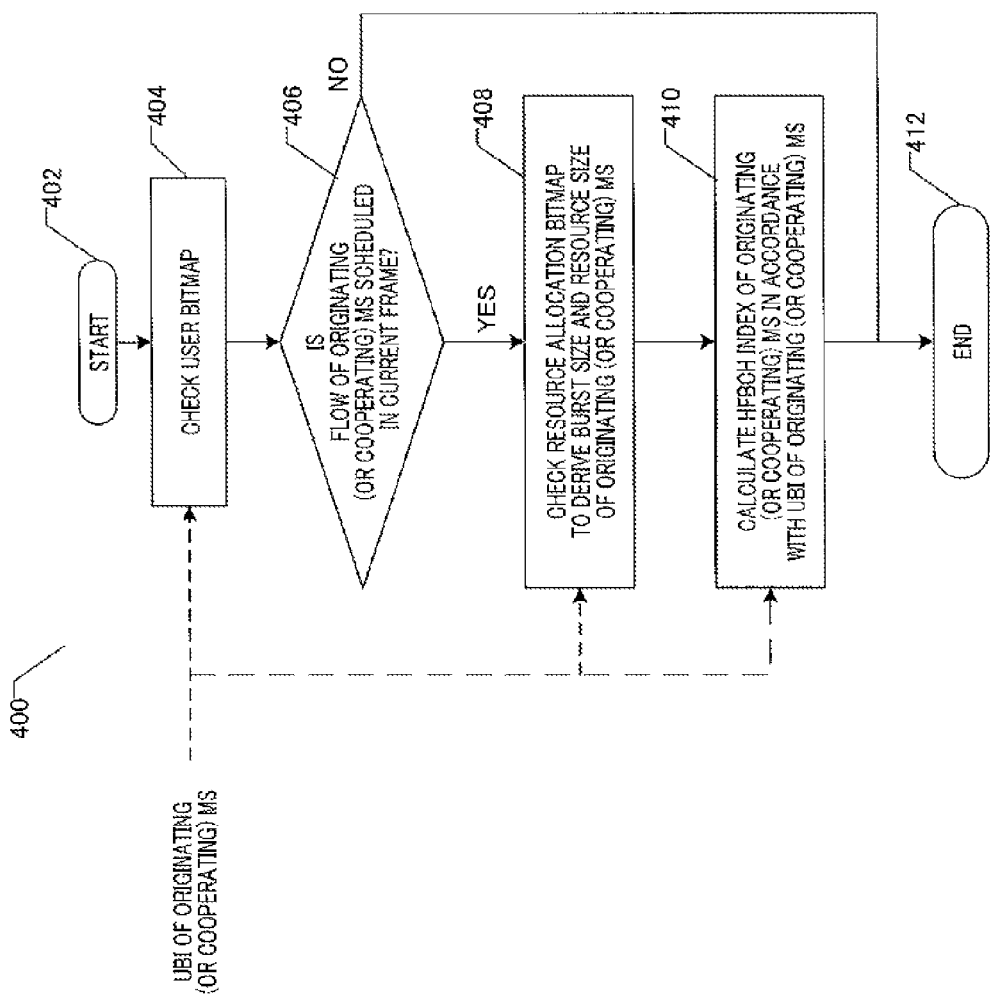
FIG. 7 shows a flowchart illustrating a method of receiving group resource allocation information at the originating MS (or cooperating MS) according to the prior art.

According to Embodiment 1 of the present invention, with reference to FIG. 1, a basic idea of the method of applying GRA to CliCo is that BS 102 shares the UBI of originating MS 104 with cooperating MS 106 using the group configuration information. In more details, when BS 102 adds a flow of cooperating MS 106 into a group, the group configuration information unicast by BS 102 to cooperating MS 106 also includes the UBI of originating MS 104. The content of the group configuration information unicast by BS 102 to cooperating MS 106 can be described below:

Flow identifier of cooperating MS 106;
User bitmap size;
UBI of originating MS 104;
UBI of cooperating MS 106;
Group identifier;
Allocation periodicity; and
MIMO mode set or the like.

According to Embodiment 1 of the present invention, since cooperating MS 106 knows the UBI of originating MS 104, cooperating MS 106 is able to use the UBI of originating MS 104 instead of its own UBI to derive its HFBCH index. As a result, only an identical HFBCH is allocated for both originating MS 104 and cooperating MS 106 engaged in CliCo. So unnecessary HFBCH resource waste is avoided.

Figure 8:
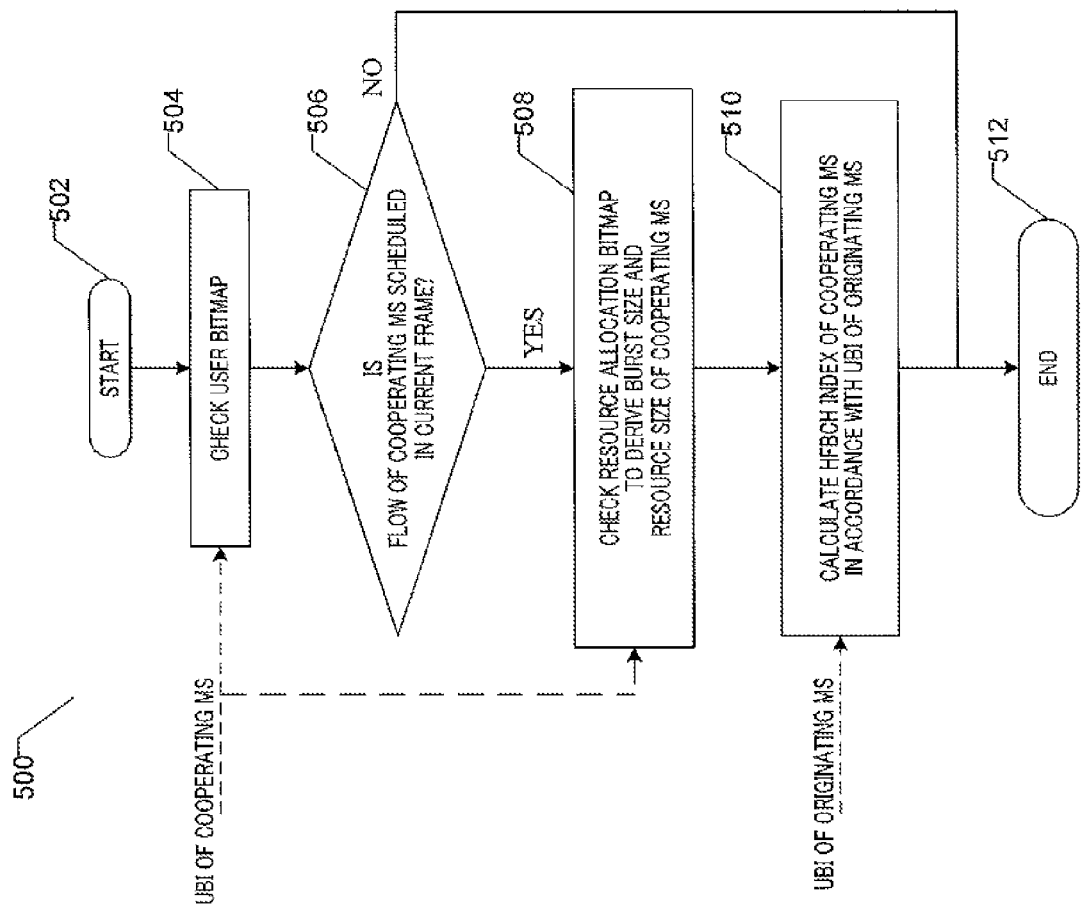
FIG. 8 shows a flowchart illustrating a method of receiving group resource allocation information at a cooperating MS according to Embodiment 1 of the present invention.

A flowchart illustrating method 500 for receiving resource scheduling information at cooperating MS 106 according to Embodiment 1 of the present invention is shown in FIG. 8. Method 500 starts at Step 502. At Step 504, cooperating MS 106 checks the user bitmap according to its UBI. At Step 506, cooperating MS 106 determines whether its flow is scheduled in the current frame or not. If the flow of cooperating MS 106 is scheduled in the current frame, at Step 508, it proceeds to check the resource allocation bitmap to derive its HARQ burst size and resource size according to its UBI. At Step 510, cooperating MS 106 computes its HFBCH index according to the UBI of originating MS 104. At Step 506, if the flow of cooperating MS 106 is not scheduled in the current frame, method 500 stops at Step 512.

According to Embodiment 1 of the present invention, the content of group configuration information unicast by BS 102 to originating MS 104, and the content of group resource allocation information multicast by BS 102 to originating MS 104 and cooperating MS 106 are the same as the IEEE 802.16m draft standard (e.g., see Non-Patent Literature 1). However, the content of group configuration information unicast by BS 102 to cooperating MS 106 is different from the IEEE 802.16m draft standard (e.g., see Non-Patent Literature 1).

According to Embodiment 1 of the present invention, an alternative is that the group configuration information is multicast by BS 102 to both originating MS 104 and cooperating MS 106. The content of the group configuration information multicast by BS 102 to both originating MS 104 and cooperating MS 106 can be described below:

Flow identifier of originating MS 104;
Flow identifier of cooperating MS 106;
User bitmap size;
UBI of originating MS 104;
UBI of cooperating MS 106;
Group identifier;
Allocation periodicity; and
MIMO mode set or the like.

According to Embodiment 1 of the present invention, the group configuration information can be transmitted in either a MAC control message or a MAP IE.

Embodiment 2

According to Embodiment 1 of the present invention, a demerit is that extra control overhead may be introduced in group configuration information before starting group resource allocation due to sharing the UBI of originating MS 104 with cooperating MS 106.

With reference to FIG. 1, as mentioned above, originating MS 104 and cooperating MS 106 engaged in CliCo handle the same data burst, and thus have the same HARQ burst size. So HARQ burst size indication for one of originating MS 104 and cooperating MS 106 is redundant. In addition, the length of UBI which is actually required depends on the user bitmap size. For example, if the user bitmap size is 8 bits, only 3-bit UBI is really required instead of 5-bit UBI.

According to Embodiment 2 of the present invention, a basic idea of the method of applying GRA to CliCo is that BS 102 shares the UBI of originating MS 104 with cooperating MS 106 using the group resource allocation information instead of the group configuration information in Embodiment 1 of the present invention. In more details, when BS 102 allocates resources to originating MS 104 and cooperating MS 106, a variable portion of the 5-bit resource allocation indication for cooperating MS 106 in resource allocation bitmap is used to indicate the UBI of originating MS 104. The length of the variable portion depends on the user bitmap size. The remaining portion in the 5-bit resource allocation indication for cooperating MS 106 is used to indicate its resource size. However, the ways for indicating the resource size of cooperating MS 106 are different, depending on the user bitmap size.

According to Embodiment 2 of the present invention, since the UBI of originating MS 104 is embedded in resource allocation bitmap, no extra control overhead is introduced in group configuration information.

Figure 9:
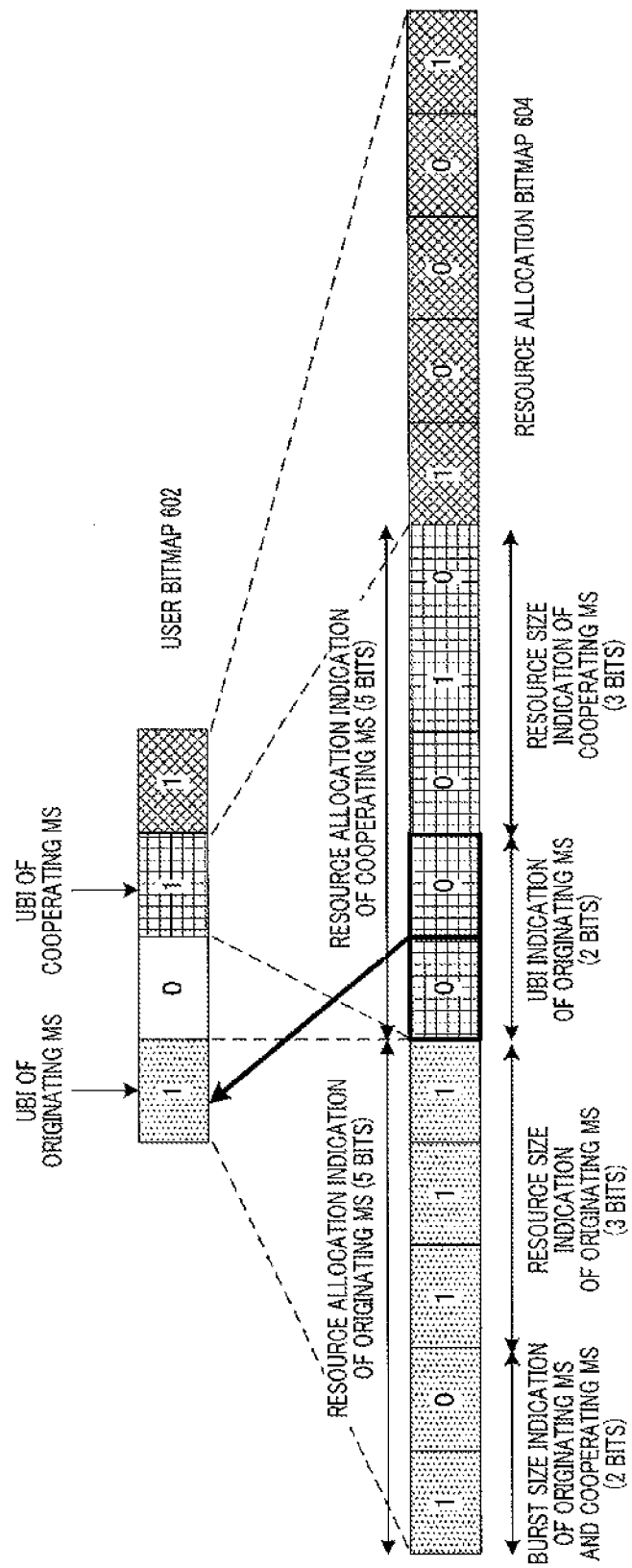
FIG. 9 shows a diagram illustrating exemplary bitmaps for carrying partial group resource allocation information in case of 4-bit user bitmap according to Embodiment 2 of the present invention.

A diagram illustrating exemplary bitmaps carrying partial group resource allocation information in case of 4-bit user bitmap according to Embodiment 2 of the present invention is shown in FIG. 9. With reference to FIG. 9, in resource allocation bitmap 604, the first 2 bits (e.g., "00") of 5-bit resource allocation indication for cooperating MS 106 are used to indicate the UBI of originating MS 104 instead of the HARQ burst size of cooperating MS 106, and the last 3 bits (e.g. "010") are used to signal the resource size for cooperating MS 106. Note that the first 2 bits (e.g., "10") of 5-bit resource allocation indication for originating MS 104 are used to signal the HARQ burst size of both originating MS 104 and cooperating MS 106.

Figure 10:
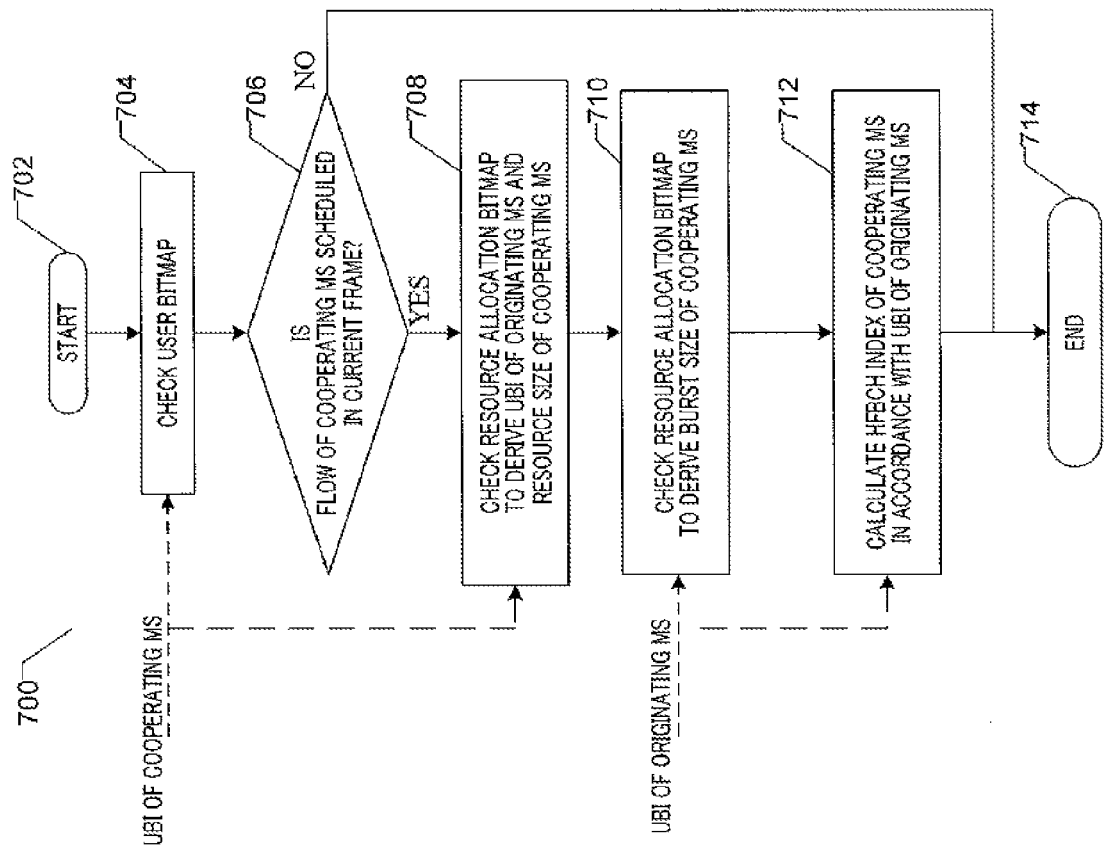
FIG. 10 shows a flowchart illustrating a method of receiving group resource allocation information in case of 4-bit user bitmap at the cooperating MS according to Embodiment 2 of the present invention.

A flowchart illustrating method 700 for receiving group resource allocation information at cooperating MS 106 in case of 4-bit user bitmap according to Embodiment 2 of the present invention is shown in FIG. 10. Method 700 starts at Step 702. At Step 704, cooperating MS 106 checks the user bitmap according to its UBI. At Step 706, cooperating MS 106 determines whether its flow is scheduled in the current frame. If the flow of cooperating MS 106 is scheduled in the current frame, at Step 708, it proceeds to check the resource allocation bitmap to derive the UBI of originating MS 104 and its resource size according to its UBI. At Step 710, cooperating MS 106 proceeds to check the resource allocation bitmap again to derive its HARQ burst size according to the UBI of originating MS 104. At Step 712, cooperating MS 106 then computes its HFBCH index according to the UBI of originating MS 104. At Step 706, if the flow of cooperating MS 106 is not scheduled in the current frame, method 700 stops at Step 714.

Figure 11:
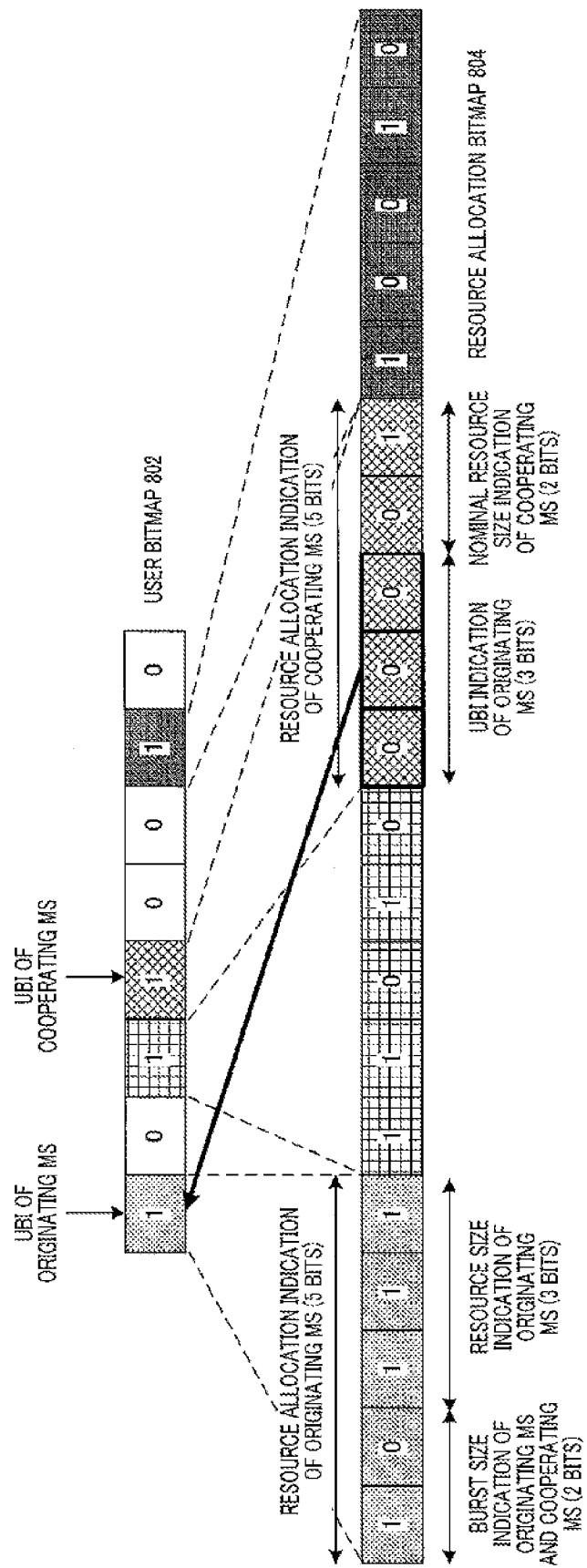
FIG. 11 shows a diagram illustrating exemplary bitmaps for carrying partial group resource allocation information in case of 8-bit user bitmap according to Embodiment 2 of the present invention.

A diagram illustrating exemplary bitmaps for carrying partial group resource allocation information in case of 8-bit user bitmap according to Embodiment 2 of the present invention is shown in FIG. 11. With reference to FIG. 11, in resource allocation bitmap 804, the first 3 bits of 5-bit resource allocation indication for cooperating MS 106 are used to indicate the UBI of originating MS 104, and the last 2 bits are used to indicate the nominal resource size of cooperating MS 106 instead of the actual resource size of cooperating MS 106.

There are various ways of calculating the actual resource size indication of cooperating MS 106 from its nominal resource indication. In one way, the actual resource size indication of cooperating MS 106 may result from a bitwise XOR operation of the resource size indication of originating MS 104 and the nominal resource size indication of cooperating MS 106. With reference to FIG. 11, the resource size indication of originating MS 104 is "111", and the nominal resource size indication of cooperating MS 106 is "01". So the actual resource size indication of cooperating MS 106 is "111 XOR 01=110". In another way, the actual resource size indication of cooperating MS 106 may result from a bitwise OR or AND operation of the resource size indication of originating MS 104 and the nominal resource size indication of cooperating MS 106.

Figure 12:
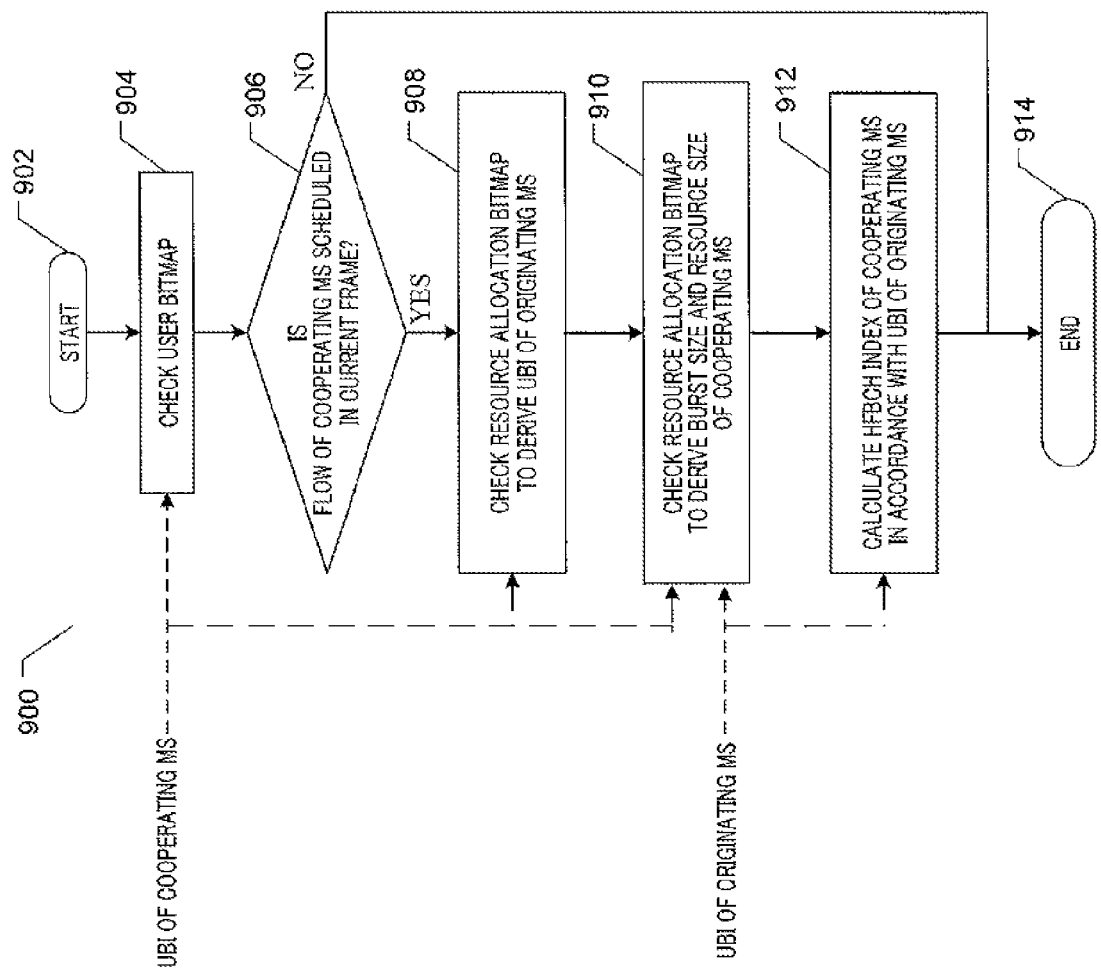
FIG. 12 shows a flowchart illustrating a method of receiving group resource allocation information in case of 8-bit user bitmap at the cooperating MS according to Embodiment 2 of the present invention.

A flowchart illustrating method 900 for receiving group resource allocation information at cooperating MS 106 in case of 8-bit user bitmap according to Embodiment 2 of the present invention is shown in FIG. 12. Method 900 starts at Step 902. At Step 904, cooperating MS 106 checks the user bitmap according to its UBI. At Step 906, cooperating MS 106 determines whether its flow is scheduled in the current frame. If the flow of cooperating MS 106 is scheduled in the current frame, at Step 908, it proceeds to check the resource allocation bitmap to derive the UBI of originating MS 104. At Step 910, cooperating MS 106 proceeds to check the resource allocation bitmap again to derive its HARQ burst size and resource size according to its UBI and the UBI of originating MS 104. At Step 912, cooperating MS 106 then computes its HFBCH index according to the UBI of originating MS 104. At Step 906, if the flow of cooperating MS 106 is not scheduled in the current frame, method 900 stops at Step 914.

According to Embodiment 2 of the present invention, similar to the case of 8-bit user bitmap, in case of 16-bit user bitmap, in the resource allocation bitmap, the first 4 bits of 5-bit resource allocation indication for cooperating MS 106 are used to indicate the UBI of originating MS 104, and the last 1 bit is used to indicate the nominal resource size of cooperating MS 106 instead of the actual resource size of cooperating MS 106.

Figure 13:
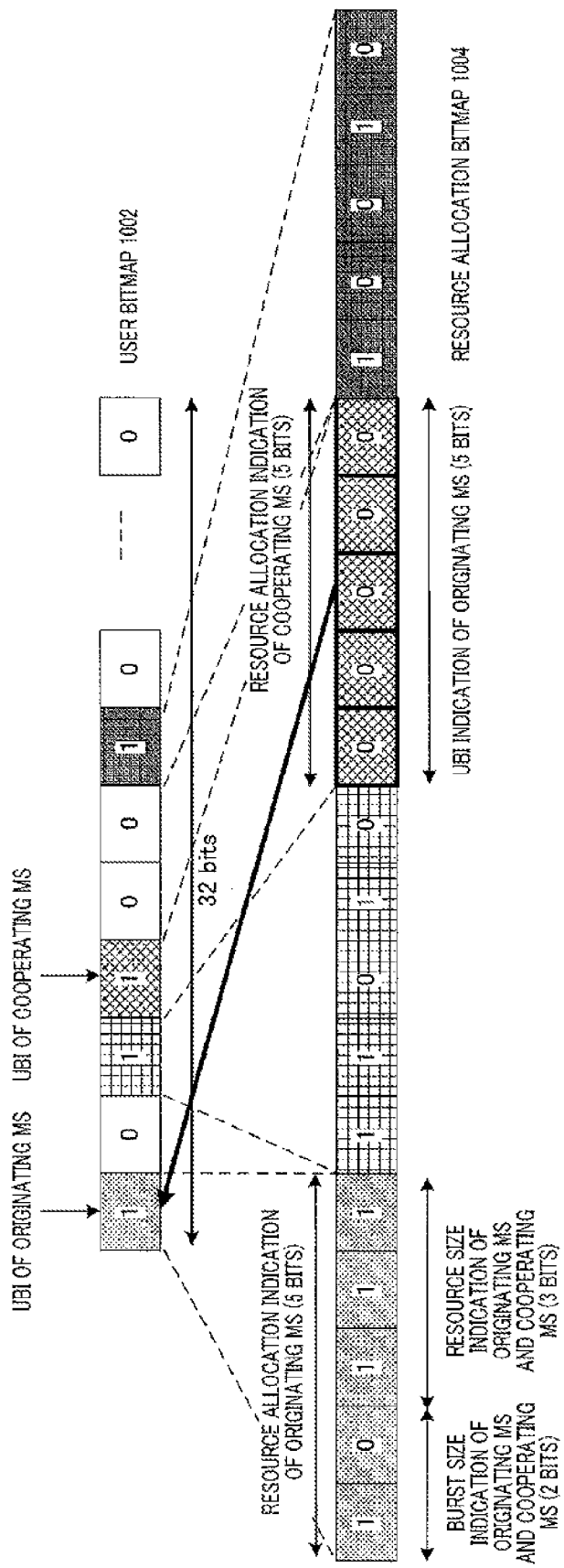
FIG. 13 shows a diagram illustrating exemplary bitmaps for carrying partial group resource allocation information in case of 32-bit user bitmap according to Embodiment 2 of the present invention.

A diagram illustrating exemplary bitmaps for carrying partial group resource allocation information in case of 32-bit user bitmap according to Embodiment 2 of the present invention is shown in FIG. 13. With reference to FIG. 13, in resource allocation bitmap 1004, the whole 5-bit resource allocation indication for cooperating MS 106 is used to indicate the UBI of originating MS 104. The resource size of cooperating MS 106 is signaled by the 3-bit resource size indication for originating MS 104. In other words, in case of 32-bit user bitmap, originating MS 104 and cooperating MS 106 have always the same resource size.

A table illustrating an exemplary GRA MAP IE for transmitting the group resource allocation information according to Embodiment 2 of the present invention is shown in Table 2.

TABLE 2

| Syntax | Size (bit) | Description/Notes |
|---|---|---|
| GRA_MAP_IE( ){ | | |
| MAP IE Type | 4 | GRA MAP IE |
| User Bitmap | Variable | Indicate scheduled MSs in a group. The size of the bitmap is equal to the User Bitmap Size signaled to each MS in the group configuration information |
| Resources Offset | 7 | Indicate starting LRU for resource allocation to this group |
| HFA Offset | 6 | Indicate the start of the HFBCH index used for scheduled allocations |
| Resource Allocation Bitmap | Variable | Indicate the UBI of the corresponding originating MS/resource size for scheduled cooperating MS and indicate |

TABLE 2-continued

| Syntax | Size (bit) | Description/Notes |
|---|---|---|
| | | the HARQ burst size/resource size for each of other scheduled MSs. Note that the ways of indicating the resource size for scheduled cooperating MS depends on the User Bitmap Size |
| ... | | |
| } | | |

Figure 14:
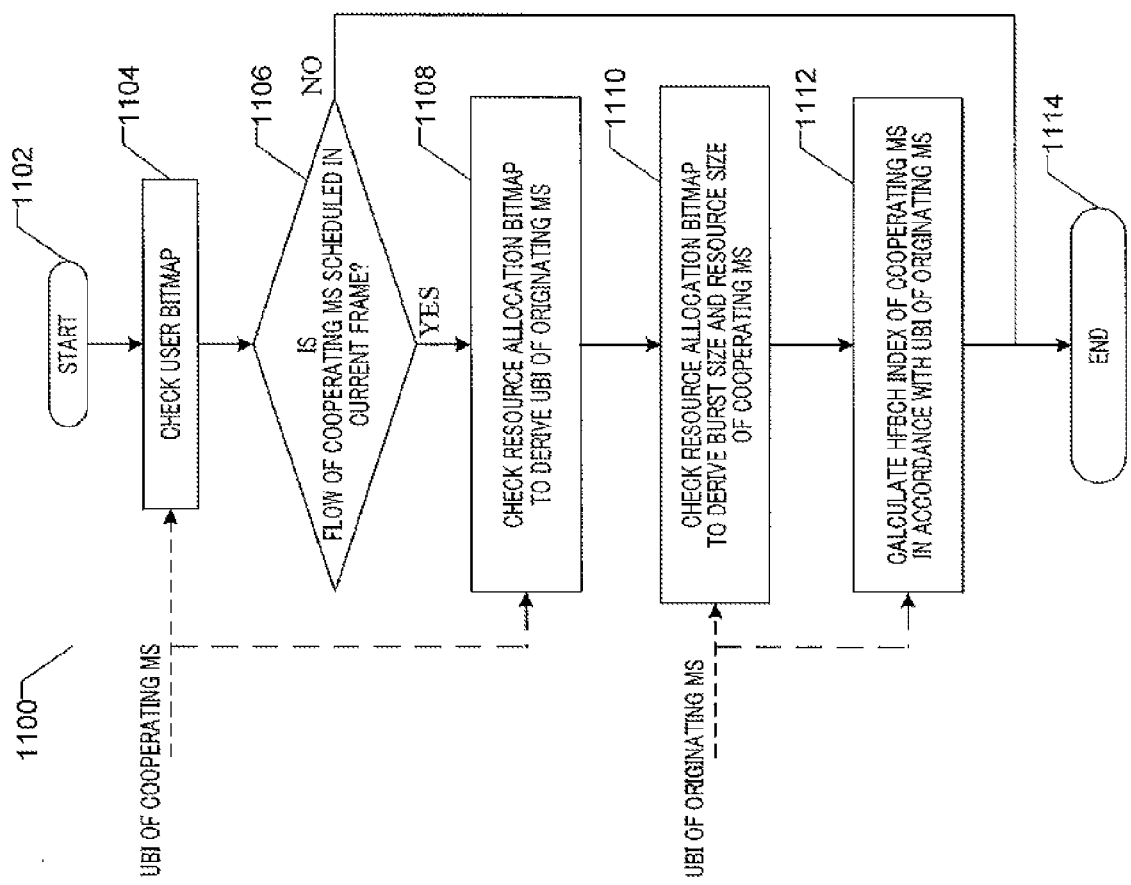
FIG. 14 shows a flowchart illustrating a method of receiving group resource allocation information in case of 32-bit user bitmap at the cooperating MS according to Embodiment 2 of the present invention.

A flowchart illustrating method 1100 for receiving group resource allocation information at cooperating MS 106 in case of 32-bit user bitmap according to Embodiment 2 of the present invention is shown in FIG. 14. Method 1100 starts at Step 1102. At Step 1104, cooperating MS 106 checks the user bitmap according to its UBI. At Step 1106, cooperating MS 106 determines whether its flow is scheduled in the current frame. If the flow of cooperating MS 106 is scheduled in the current frame, at Step 1108, it proceeds to check the resource allocation bitmap to derive the UBI of originating MS 104. At Step 1110, cooperating MS 106 proceeds to check the resource allocation bitmap again to derive its HARQ burst size and resource size according to the UBI of originating MS 104. At Step 1112, cooperating MS 106 then computes its HFBCH index according to the UBI of originating MS 104. At Step 1106, if the flow of cooperating MS 106 is not scheduled in the current frame, method 1100 stops at Step 1114.

From the perspective of cooperating MS 106, the difference among methods 700, 900 and 1100 is the way of deriving its resource size. In method 700, the resource size of cooperating MS 106 is derived according to its own UBI. In method 900, the resource size of cooperating MS 106 is derived according to its own UBI and the UBI of originating MS 104. In method 1100, the resource size of cooperating MS 106 is derived according to the UBI of originating MS 104 only.

According to Embodiment 2 of the present invention, an alternative in case of 8-bit user bitmap is that in the resource allocation bitmap, the first 3 bits of 5-bit resource allocation indication for cooperating MS 106 are used to indicate the UBI of originating MS 104 and the last 2 bits are used to directly signal the actual resource size of cooperating MS 106 instead of the nominal resource size of cooperating MS 106. Similarly, an alternative in case of 16-bit user bitmaps is that in the resource allocation bitmap, the first 4 bits of 5-bit resource allocation indication for cooperating MS 106 are used to indicate the UBI of originating MS 104, and the last 1 bit is used to indicate the actual resource size of cooperating MS 106.

According to Embodiment 2 of the present invention, an alternative in case of 4-bit user bitmap is that in the resource allocation bitmap, the first 2 bits of 5-bit resource allocation indication for cooperating MS 106 are used to indicate the UBI of originating MS 104, and the last 3 bits are used to indicate the nominal resource size of cooperating MS 106 instead of the actual resource size of cooperating MS 106. The actual resource size indication of cooperating MS 106 can be derived from the resource size indication of originating MS 104 and the nominal resource size indication of cooperating MS 106 in the above-mentioned manners.

According to Embodiment 2 of the present invention, an alternative in case of 32-bit user bitmap is that the whole 5-bit resource allocation indication of cooperating MS 106 in the resource allocation bitmap is used to signal the UBI of originating MS 104, but the resource size of cooperating MS 106 is always set to a predetermined value.

According to Embodiment 2 of the present invention, the content of group configuration information unicast by BS 102 to originating MS 104 or cooperating MS 106 is the same as the IEEE 802.16m draft standard (e.g., see Non-Patent Literature 1). However, the content of group resource allocation information multicast by BS 102 to originating MS 104 or cooperating MS 106 is different from the IEEE 802.16m draft standard (e.g., see Non-Patent Literature 1).

According to Embodiment 2 of the present invention, the group resource allocation information can be transmitted in either multicast MAC control information or a multicast MAP IE.

Embodiment 3

According to Embodiments 1 and 2 of the present invention, the UBI indication of originating MS 104 in resource allocation bitmap is assumed to be different from the UBI of cooperating MS 106. In the following, the case that the UBI indication of originating MS 104 in resource allocation bitmap is the same as the UBI of cooperating MS 106 is addressed.

Figure 15:
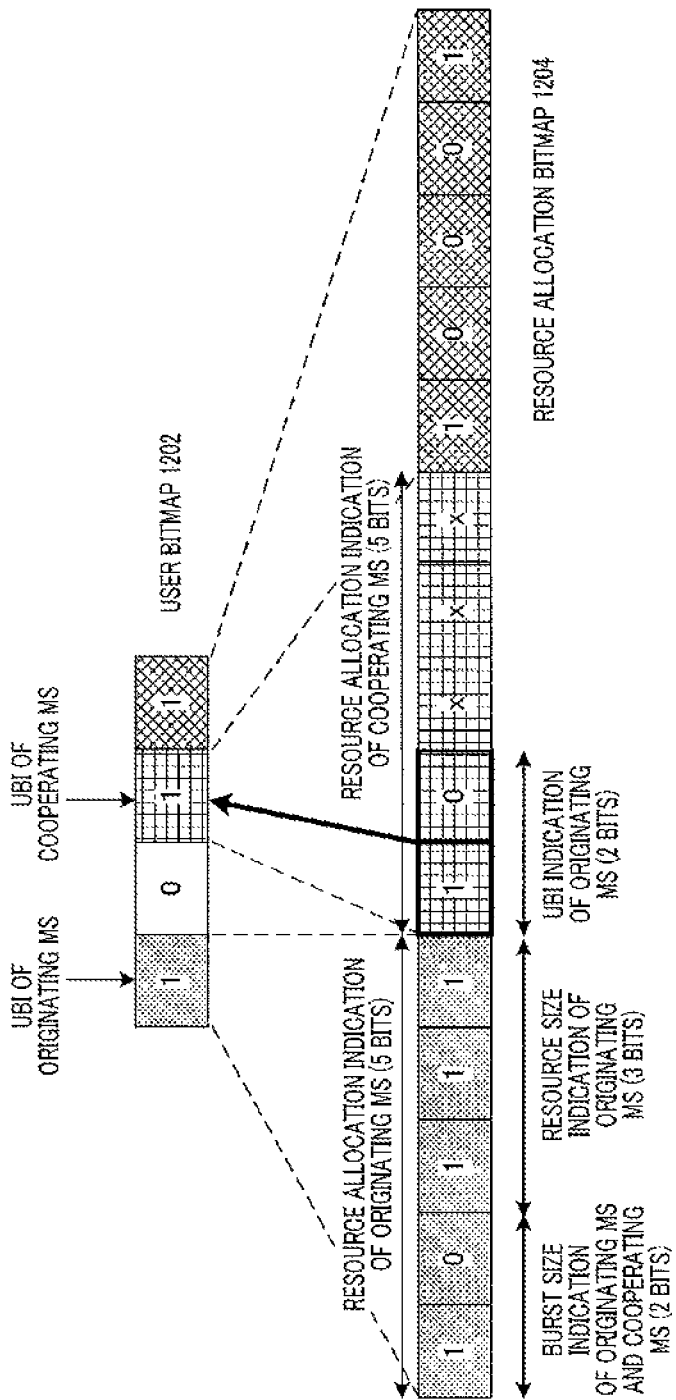
FIG. 15 shows a diagram illustrating exemplary bitmaps for carrying partial group resource allocation information in case of 4-bit user bitmap according to Embodiment 3 of the present invention.

A diagram illustrating exemplary bitmaps for carrying partial group resource allocation information in case of 4-bit user bitmap according to Embodiment 3 of the present invention is shown in FIG. 15. With reference to FIG. 15, in resource allocation bitmap 1204, the first 2 bits of 5-bit resource allocation indication for cooperating MS 106 are used to indicate the UBI of originating MS 104. If the UBI indication of originating MS 104 (e.g. "10") is the same as the UBI of cooperating MS 106, various implications may be incurred. For example, this may imply that corresponding MS 106 will not transmit/receive the UL/DL data burst in the following N consecutive allocation periods, where N is predetermined. Alternatively, the value of N is indicated by the last 3 bits of 5-bit resource allocation indication for cooperating MS 106. Alternatively, this may imply that cooperating MS 106 will no longer transmit/receive the UL/DL data burst.

According to Embodiment 3 of the present invention, in case of 8-bit, 16-bit or 32-bit user bitmap, if the UBI indication of originating MS 104 in resource allocation bitmap is the same as the UBI of cooperating MS 106, implications similar to those in the case of 4-bit user bitmap may be incurred.

Embodiment 4

According to Embodiments 1, 2 and 3 of the present invention, the length of the UBI indication of originating MS 104 is dependent on the user bitmap size. As a result, in case of 4-bit user bitmap, 3 bits can be used to signal the resource size of cooperating MS 106. Thus a full set of 8 resource sizes can be used for allocating resources to cooperating MS 106. However, in case of 8-bit, 16-bit, or 32-bit user bitmap, only a subset of 8 resource sizes can be used for allocating resources to cooperating MS 106. This would decrease the scheduling flexibility of BS 102.

Figure 16:
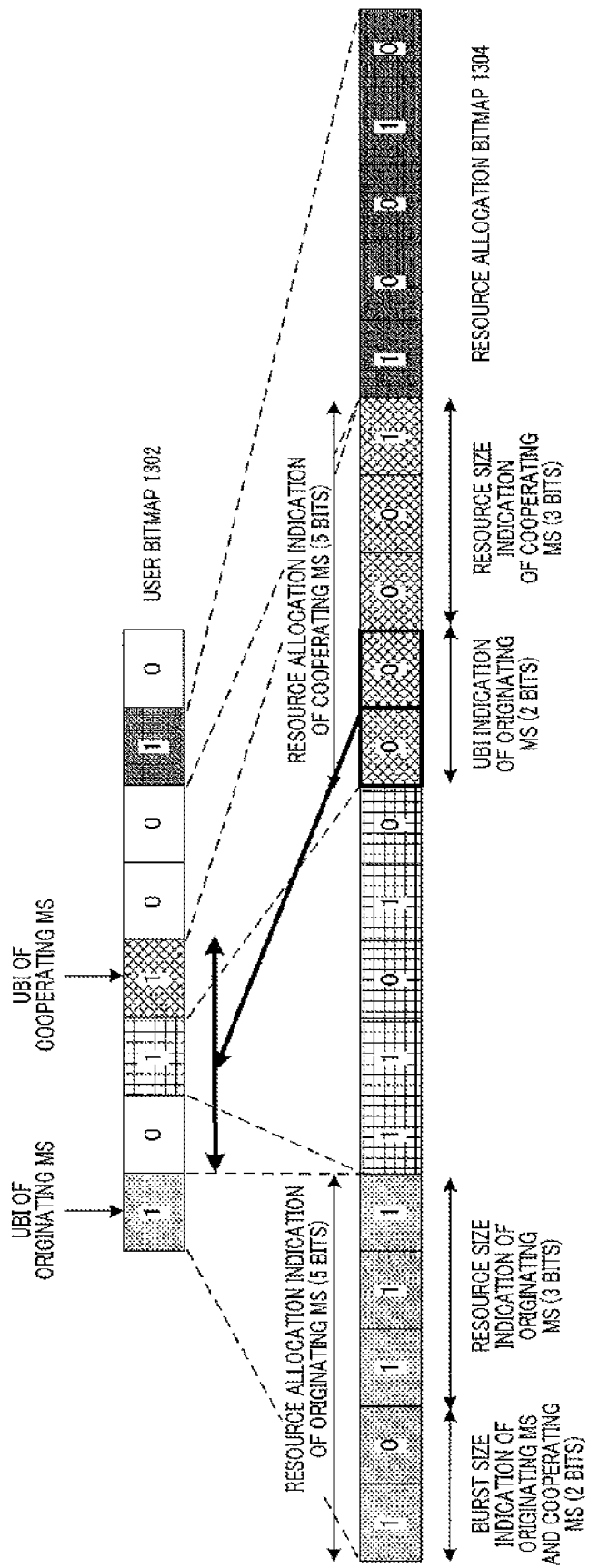
FIG. 16 shows a diagram illustrating exemplary bitmaps for carrying partial group resource allocation information in case of 8-bit user bitmap according to Embodiment 4 of the present invention.

A diagram illustrating exemplary bitmaps for carrying partial group resource allocation information in case of 8-bit user bitmap according to Embodiment 4 of the present invention is shown in FIG. 16. With reference to FIG. 16, in resource allocation bitmap 1304, only the first 2 bits of 5-bit resource allocation indication for cooperating MS 106 are used to indicate the offset of the UBI of originating MS 104 relative to the UBI of cooperating MS 106, and the last 3 bits are used to indicate the resource size of cooperating MS 106.

A table illustrating an exemplary GRA MAP IE for transmitting the group resource allocation information according to Embodiment 4 of the present invention is shown in Table 3.

TABLE 3

| Syntax | Size (bit) | Description/Notes |
|---|---|---|
| GRA_MAP_IE( ){ | | |
| MAP IE Type | 4 | GRA MAP IE |
| User Bitmap | Variable | Indicate scheduled MSs in a group. The size of the bitmap is equal to the User Bitmap Size signaled to each MS in the group configuration information |
| Resource Offset | 7 | Indicate starting LRU for resource allocation to this group |
| HFA offset | 6 | Indicate the start of the HFBCH index used for scheduled allocations |
| Resource Allocation Bitmap | Variable | Indicate the UBI offset of corresponding originating MS relative to scheduled cooperating MS/resource size for scheduled cooperating MS and indicate the HARQ burst size/resource size for each of other scheduled MSs. |
| ... | | |
| } | | |

According to Embodiment 4 of the present invention, since only 2 bits are used for the UBI indication of originating MS 104 in case of 8-bit, 16-bit, or 32-bit user bitmap, various constraints need to be imposed when BS 102 adds flows of originating MS 104 and cooperating MS 106 into a group. For example, BS 102 may suffer the following constraints when adding flows of originating MS 104 and cooperating MS 106 into a group:

the UBI of originating MS 104 is smaller than the UBI of cooperating MS 106; and The difference between the UBIs of originating MS 104 and cooperating MS 106 is not larger than 4.

According to Embodiment 4 of the present invention, since 3 bits are used to indicate the resource size of cooperating MS 106, a full set of 8 resource sizes can be used for allocating resources to cooperating MS 106, even in case of 8-bit, 16-bit, or 32-bit user bitmap.

Embodiment 5

According to Embodiment 4 of the present invention, some constraints need to be imposed when BS 102 adds the flows of originating MS 104 and cooperating MS 106 into a group. This may decrease group configuration flexibility of BS 102.

Figure 17:
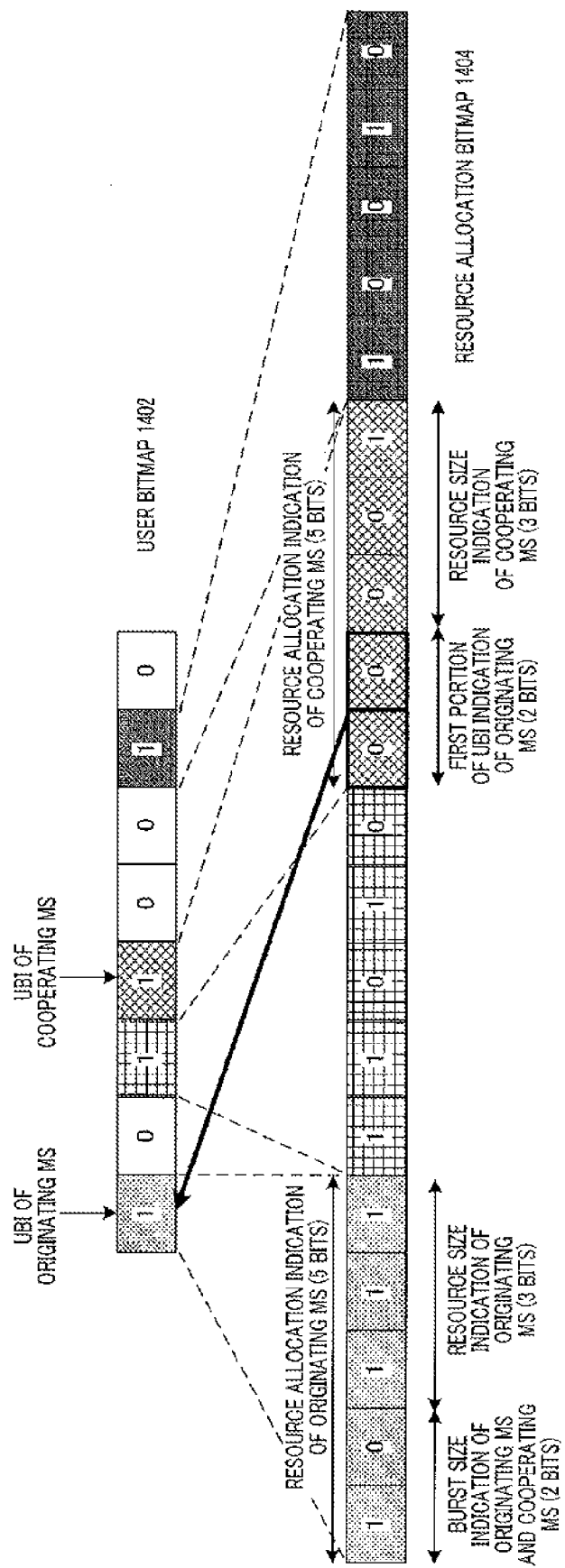
FIG. 17 shows a diagram illustrating exemplary bitmaps for carrying partial group resource allocation information in case of 8-bit user bitmap according to Embodiment 5 of the present invention.

A diagram illustrating exemplary bitmaps for carrying partial group resource allocation information in case of 8-bit user bitmap according to Embodiment 5 of the present invention is shown in FIG. 17. With reference to FIG. 17, in resource allocation bitmap 1404, the first 2 bits of 5-bit resource allocation indication for cooperating MS 106 are used to indicate a first portion of the UBI of originating MS 104 and the last 3 bits are used to indicate the resource size of cooperating MS 106.

A table illustrating an exemplary GRA MAP IE for transmitting the group resource allocation information according to Embodiment 5 of the present invention is shown in Table 4.

TABLE 4

| Syntax | Size (bit) | Description/Notes |
|---|---|---|
| GRA_MAP_IE( ){ | | |
| MAP IE Type | 4 | GRA MAP IE |
| User Bitmap | Variable | Indicate scheduled MSs in a group. The size of the bitmap is equal to the User Bitmap Size signaled to each MS in the group configuration information |
| Resource Offset | 7 | Indicate starting LRU for resource allocation to this group |
| HFA Offset | 6 | Indicate the start of the HFBCH index used for scheduled allocations |
| Resource Allocation Bitmap | Variable | Indicate a first portion of UBI of the corresponding originating MS/resource size for scheduled cooperating MS and indicate the HARQ burst size/resource size for each of other scheduled MSs. |
| ... | | |
| } | | |

According to Embodiment 5 of the present invention, the group configuration information unicast by BS 102 to cooperating MS 106 includes a second portion of the UBI of originating MS 104. The content of the group configuration information unicast by BS 102 to cooperating MS 106 can be described below:

Flow identifier of cooperating MS 106;

User bitmap size;

A second portion of the UBI of originating MS 104;

UBI of cooperating MS 106;

Group ID;

Allocation periodicity; and

MIMO mode set or the like.

According to Embodiment 5 of the present invention, since 3 bits carried in group configuration information and group resource allocation information are used for the UBI indication of originating MS 104 in case of 8-bit user bitmap, no constraints need to be imposed when BS 102 adds the flows of originating MS 104 and cooperating MS 106 into a group.

According to Embodiment 5 of the present invention, the first portion of the UBI of originating MS 104 may be 2 LSBs (Least Significant Bits) of the UBI of originating MS 104. The second portion of the UBI of originating MS 104 may be 1 MSB (Most Significant Bit), 2 MSBs and 3 MSBs of the UBI of originating MS 104 in case of 8-bit, 16-bit and 32-bit user bitmap, respectively.

According to Embodiment 5 of the present invention, alternatively the first portion of the UBI of originating MS 104 may be 2 MSBs of the UBI of originating MS 104. The second portion of the UBI of originating MS 104 may be 1 LSB, 2 LSBs and 3 LSBs of the UBI of originating MS 104 in case of 8-bit, 16-bit and 32-bit user bitmap, respectively. According to the above-mentioned embodiments of the present invention, BS 102 shares the UBI of originating MS 104 with cooperating MS 106 such that cooperating MS 106 is able to use the UBI of originating MS 104 to calculate its HFBCH index. It will be naturally appreciated by a person skilled in the art that numerous variations and/or modifications may be made to the present invention, in which BS 102 shares the UBI of cooperating MS 106 with originating MS 104.

According to the above-mentioned embodiments of the present invention, in addition to originating MS 104, only one cooperating MS 106 is involved in CliCo. It will be naturally appreciated by a person skilled in the art that numerous variations and/or modifications may be made to the present invention, in which more than one cooperating MSs involve in CliCo, and BS 102 shares the UBI of one of the originating MS and the cooperating MSs engaged in CliCo with the others.

It will be naturally appreciated by a person skilled in the art that other numerous variations and/or modifications may be made to the present invention as shown in the specific embodiments without departing from the spirit or scope of the invention as broadly described. The present embodiments are, therefore, to be considered in all respects to be illustrative and not restrictive.

Although cases have been described with the above embodiments as examples where the present invention is configured by hardware, the present invention can also be realized by software in interworking with hardware.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-097026, filed on Apr. 20, 2010, including the specification, drawings and abstract is incorporated herein by reference in its entirety.

INDUSTRIAL APPLICABILITY

The present invention is applicable to a mobile communication system or the like.

The invention claimed is:

1. A base station that communicates with a plurality of mobile stations, comprising:
 a control signal generation section configured to generate control signals indicative of resource allocation information for each of the plurality of mobile stations; and
 a transmission section configured to transmit the generated control signals to the plurality of mobile stations, wherein,
 a control signal for a first mobile station in the plurality of mobile stations contains information on a second mobile station in the plurality of mobile stations, the first mobile station being used for communication between the base station and the second mobile station, and
 the control signal for the first mobile station contains information on the second mobile station and the information on the second mobile station is contained in resource allocation information for the first mobile station.

2. The base station according to claim 1, wherein when the first mobile station is added into a same group as the second mobile station, the control signal for the first mobile station contains information on the second mobile station.

3. The base station according to claim 1, wherein the information on the second mobile station is replaced with burst size information for the first mobile station.

4. The base station according to claim 1, wherein the number of bits of the information on the second mobile station varies depending on the number of mobile stations which belong to a same group as the second mobile station.

5. The base station according to claim 4, wherein the number of bits of the information on the second mobile station varies with increasing of the number of bits of the burst size information for the first mobile station and with decreasing of the number of bits of the resource size information for the first mobile station, depending on the number of mobile stations which belong to a same group as the second mobile station.

6. The base station according to claim 5, wherein when the number of bits of the resource size information for the first mobile station is decreased, an actual resource size of the first mobile station results from a bitwise operation of a resource size of the second mobile station and a nominal resource size of the first mobile station.

7. The base station according to claim 1, wherein a resource size of the first mobile station is same as that of the second mobile station, and the information on the second mobile station is replaced with burst size information and resource size information for the first mobile station.

8. The base station according to claim 1, wherein an actual resource size of the first mobile station results from a bitwise operation of a resource size of the second mobile station and a nominal resource size of the first mobile station.

9. The base station according to claim 3, wherein a resource size of the first mobile station is set to a determined value, and the information on the second mobile station is replaced with burst size information and resource size information for the first mobile station.

10. The base station according to claim 1, wherein the information on the second mobile station is identification information of the second mobile station.

11. The base station according to claim 1, wherein the information on the second mobile station is an offset of identification information of the second mobile station relative to identification information of the first mobile station.

12. The base station according to claim 1, wherein a part of the information on the second mobile station is contained into resource allocation information for the first mobile station, and other part of the information on the second mobile station is contained into group configuration information transmitted to the first mobile station.

13. A mobile station, comprising:
 a reception section configured to receive a control signal for the mobile station containing information on another mobile station;
 a resource calculating section configured to compute a transmission resource according to the control signal, the information on the other mobile station being contained in resource allocation information of the control signal to the mobile station; and
 a transmission section configured to transmit a signal received from the other mobile station, to the base station via the transmission resource.

14. The mobile station according to claim 13, wherein when the information on the other mobile station indicates identification information of the mobile station, the transmission section is configured to stop transmitting the signal to the base station.

15. The mobile station according to claim 13, wherein when the information on the other mobile station indicates identification information of the mobile station, the transmission section is configured to stop transmitting the signal to the base station for a determined or configurable time period.

16. A transmission method performed in a base station that communicates with a plurality of mobile stations, comprising:
   generating control signals indicative of resource allocation information for each of the plurality of mobile stations; and
   transmitting the generated control signals to the plurality of mobile stations, wherein, a control signal for a first mobile station in the plurality of mobile stations contains information on a second mobile station in the plurality of mobile stations, the first mobile station being used for communication between the base station and the second mobile station, and
   the control signal for the first mobile station contains information on the second mobile station and the information on the second mobile station is contained in resource allocation information for the first mobile station.

17. A reception method performed in a mobile station, comprising:
   receiving a control signal for the mobile station containing information on another mobile station;
   computing a transmission resource according to the control signal and the information on the other mobile station,
   the information on the other mobile station being contained in resource allocation information of the control signal to the mobile station; and
   transmitting a signal received from the other mobile station, to the base station via the transmission resource.

* * * * *